US012782730B2

(12) United States Patent
Le et al.

(10) Patent No.: US 12,782,730 B2
(45) Date of Patent: Nov. 3, 2026

(54) VISION CORRECTION FOR NEAR EYE DISPLAY

(71) Applicant: Tencent America LLC, Palo Alto, CA (US)

(72) Inventors: John D. Le, Palo Alto, CA (US); Kun Gao, Palo Alto, CA (US); Yi Zhang, Palo Alto, CA (US); Youngshik Yoon, Palo Alto, CA (US); Hao Zheng, Palo Alto, CA (US); Hongdong Li, Palo Alto, CA (US); Jianru Shi, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 385 days.

(21) Appl. No.: 18/201,633

(22) Filed: May 24, 2023

(65) Prior Publication Data

US 2024/0393582 A1 Nov. 28, 2024

(51) Int. Cl.
*G02B 27/01* (2006.01)
*G02C 7/08* (2006.01)

(52) U.S. Cl.
CPC .. *G02B 27/0172* (2013.01); *G02B 2027/0178* (2013.01); *G02C 7/08* (2013.01)

(58) Field of Classification Search
CPC .......... G02B 27/0172; G02B 2027/011; G02B 2027/0159; G02B 2027/0185; G02B 3/0081; G02B 3/12; G02B 3/14; G02B 7/021; G02B 7/023; G02B 7/06; G02C 7/08–088
See application file for complete search history.

(56) References Cited

U.S. PATENT DOCUMENTS

| | | | | |
|---|---|---|---|---|
| 6,464,355 | B1 | 10/2002 | Gil | |
| 9,945,999 | B2 | 4/2018 | Wong et al. | |
| 10,663,745 | B2 | 5/2020 | Ouderkirk et al. | |
| 10,816,804 | B2 * | 10/2020 | Martinez | G02B 27/0172 |

(Continued)

FOREIGN PATENT DOCUMENTS

| | | | | |
|---|---|---|---|---|
| CN | 115291417 A | * 11/2022 | | G02C 7/02 |
| CN | 116338941 A | * 6/2023 | | G02B 27/0093 |

(Continued)

OTHER PUBLICATIONS

English machine translation of CN-115291417-A (Year: 2022).*

(Continued)

*Primary Examiner* — Nicholas R. Pasko
(74) *Attorney, Agent, or Firm* — ARENTFOX SCHIFF LLP

(57) ABSTRACT

Aspects of the disclosure provide an optical system. The optical system includes a first lens, a second lens, and a vision correction adapter. The first lens includes a first optically transparent member having a first surface and a second surface. A second lens includes a second optically transparent member having a third surface and a fourth surface. The vision correction adapter is positioned between the first lens and the second lens. The first lens and the second lens are spaced apart by a thickness of the vision correction adapter, and the thickness of the vision correction adapter is selected to correct for one of nearsightedness or farsightedness. A center region of the vision correction adapter includes an opening.

4 Claims, 18 Drawing Sheets

(56) References Cited

U.S. PATENT DOCUMENTS

| | | | | |
|---|---|---|---|---|
| 11,378,806 | B1 * | 7/2022 | Cooke | G02B 26/004 |
| 2010/0232040 | A1 | 9/2010 | Iwasawa et al. | |
| 2019/0384071 | A1 * | 12/2019 | Son | G02C 5/001 |
| 2020/0096770 | A1 * | 3/2020 | Pedder | G02B 27/0172 |
| 2020/0124857 | A1 | 4/2020 | Bierhuizen et al. | |
| 2021/0286108 | A1 * | 9/2021 | Topliss | G02B 3/14 |
| 2023/0333346 | A1 * | 10/2023 | Chiu | G02B 27/0172 |
| 2023/0393384 | A1 * | 12/2023 | Yamanaka | G02B 25/001 |
| 2024/0069303 | A1 * | 2/2024 | Huang | G02B 7/04 |

FOREIGN PATENT DOCUMENTS

| | | | | |
|---|---|---|---|---|
| JP | 2010-186135 A | 8/2010 | | |
| KR | 10-1976759 B1 | 8/2019 | | |
| WO | WO-2022180888 A1 * | 9/2022 | | G02B 25/001 |

OTHER PUBLICATIONS

Frisen, Lars, and Anders Glansholm. "Optical and neural resolution in peripheral vision." Investigative Ophthalmology & Visual Science 14.7 (1975): 528-536.

Costa, Ana Luiza Fontes de Azevedo, and Vagner Rogério dos Santos. "From vision to citizenship: types of tables to assess reading in special education." Revista Brasileira de Oftalmologia 77 (2018): 296-302.

Wong, Timothy L., et al. "Folded optics with birefringent reflective polarizers." Digital Optical Technologies 2017. vol. 10335. SPIE, 2017, pp. 1-8.

Hao, B., Wong, T., Le, J., Aastuen, D., Kotz, A., Rosen, D., McGrath, K. and Kent, S., "Building a Predictive Model of Contrast Ratio of Folded Optic Lens Systems for Virtual Reality". 3M Company, 3M Center, St. Paul, MN, 2022, pp. 1-4.

Kress, B.C. and Peroz, C., Feb. 2020, Optical architectures for displays and sensing in augmented, virtual, and mixed reality (AR, VR, MR). In Proc. SPIE (vol. 11310, p. 1131001).

Kress, B.C., 2020. Optical architectures for augmented-, virtual-, and mixed-reality headsets. (No Title). chapter 5-6 (p. 37-52).

Vision correction. New Optix Optometry, Apr. 9, 2019, http://newoptixoptometry.com/education/vision-correction/, pp. 1-4.

International Search Report and Written Opinion received for PCT Patent Application No. PCT/US2023/074637, mailed on May 6, 2024, 12 pages.

Office Action received for Japanese Patent Application No. 2025-555813, mailed on Jul. 7, 2026, 11 pages (5 pages of English Translation and 6 pages of Original Document).

* cited by examiner

Myopia

Hyperopia

Astigmatism

| | | | | No correction | Correction |
|---|---|---|---|---|---|
| | Relative Diopter | | Gap (mm) | RMS radius (micron) | RMS radius (micron) |
| 501 | 0.00 | Normal | 2.44 | 3.20 | 3.20 |
| 502 | -0.50 | Nearsighted | 2.31 | 30.60 | 3.10 |
| 503 | -1.50 | Nearsighted | 2.06 | 91.60 | 2.90 |
| 504 | -3.50 | Nearsighted | 1.55 | 213.60 | 2.70 |
| 505 | -7.50 | Nearsighted | 0.54 | 457.60 | 2.00 |
| 506 | 0.49 | Farsighted | 2.56 | 30.10 | 3.20 |
| 507 | 1.00 | Farsighted | 2.69 | 61.10 | 3.30 |
| 508 | 1.50 | Farsighted | 2.82 | 91.60 | 3.40 |
| 509 | 2.50 | Farsighted | 3.07 | 152.60 | 3.50 |
| 510 | 4.50 | Farsighted | 3.57 | 274.60 | 3.80 |
| 511 | 8.50 | Farsighted | 4.58 | 518.70 | 4.40 |

*FIG. 5D*

| | | | | No Correction | Correction |
|---|---|---|---|---|---|
| | Relative Diopter | Cylindrical Sag (mm) | Radius (mm) | RMS Y Size (micron) | RMS Y Size (micron) |
| 601 | 0.00 | 0.00 | infinite | 2.20 | 2.20 |
| 602 | -0.50 | -0.20 | -2632.00 | 21.60 | 2.20 |
| 603 | -1.50 | -0.60 | -853.00 | 64.60 | 2.10 |
| 604 | 0.49 | 0.19 | 2760.00 | 21.20 | 2.30 |
| 605 | 1.00 | 0.37 | 1371.00 | 43.10 | 2.40 |
| 606 | 1.50 | 0.55 | 926.00 | 64.70 | 2.40 |

*FIG. 6B*

| Tilt (Deg) | Prism Diopter | Field Angle | RMS Radius (micron) |
|---|---|---|---|
| 3.00 | 5.59 | 3.20 | 9.70 |
| 2.00 | 3.75 | 2.15 | 6.60 |
| 1.00 | 1.92 | 1.10 | 4.20 |
| 0.00 | 0.00 | 0.00 | 3.20 |

*FIG. 8B*

VISION CORRECTION FOR NEAR EYE DISPLAY

TECHNICAL FIELD

The present disclosure relates to near eye display technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Near eye display (NED) devices are being developed to provide an improved user experience in fields such as augmented reality (AR) and virtual reality (VR). The NED devices can include various wearable devices, such as a head mounted display (HMD) device, smart glasses, and the like. In an example, an HMD device includes a relatively small display device and optics that can create a virtual image in the field of view of one or both eyes. To the eye, the virtual image appears at a distance and appears much larger than the relatively small display device.

SUMMARY

Aspects of the disclosure provide an optical system. The optical system includes a first lens, a second lens, and a vision correction adapter. The first lens includes a first optically transparent member having a first surface and a second surface. A second lens includes a second optically transparent member having a third surface and a fourth surface. The vision correction adapter is positioned between the first lens and the second lens. The first lens and the second lens are spaced apart by a thickness of the vision correction adapter, and the thickness of the vision correction adapter is selected to correct for one of nearsightedness or farsightedness. A center region of the vision correction adapter includes an opening. The first lens can be flexible.

In an embodiment, the vision correction adapter is a band between two parallel surfaces.

In an example, the thickness of the vision correction adapter is less than a threshold thickness to correct for the nearsightedness, and the thickness of the vision correction adapter is larger than the threshold thickness to correct for the farsightedness.

In an example, the optical system includes a reflective polarizer disposed on one of the first surface and the second surface and a beam splitter disposed on one of the third surface and the fourth surface. The beam splitter is configured to partially transmit and partially reflect light incident onto the beam splitter. The reflective polarizer is configured to pass through light having a first linear polarization state and reflect light having a second linear polarization state that is orthogonal to the first linear polarization state. An optical cavity of at least one of the first lens and the second lens is formed between the reflective polarizer and the beam splitter. The optical system is configured to direct light from a display device to a viewing area, a path of the light from the display device traveling through the optical cavity a plurality of times.

Aspects of the disclosure provide an optical system. The optical system includes a first lens that is flexible and a vision correction adapter. A shape of the vision correction adapter is based on a degree of astigmatism and an orientation of the astigmatism, and the vision correction adapter is configured to alter a shape of the first lens to conform to the shape of the vision correction adapter to correct for the astigmatism.

In an example, a center region of the vision correction adapter includes an opening, the vision correction adapter includes a band and a curved surface, a shape of the curved surface is based on the degree of the astigmatism and the orientation of the astigmatism, and the curved surface is configured to alter the shape of the first lens to conform to the shape of the curved surface.

In an example, the vision correction adapter includes discrete point contacts positioned on a curved surface, a shape of the curved surface is based on the degree of the astigmatism and the orientation of the astigmatism, and the discrete point contacts positioned on the curved surface are configured to alter the shape of the first lens to conform to the shape of the curved surface.

Aspects of the disclosure provide an optical system. The optical system includes a first lens that is flexible and a vision correction adapter. The first lens includes a first optically transparent member having a first surface and a second surface. A center region of the vision correction adapter includes an opening, a tilted surface of the vision correction adapter is tilted with respect to an optical axis of the optical system, a tilt angle and an orientation of the tilted surface of the vision correction adapter are based on double vision, and the vision correction adapter is configured to tilt the first lens according to the tilt angle and the orientation of the tilted surface of the vision correction adapter to correct for the double vision.

In an example, the vision correction adapter includes a band and the tilted surface.

In an example, the optical system includes a second lens including a second optically transparent member having a third surface and a fourth surface, a reflective polarizer, and a beam splitter. The reflective polarizer is disposed on one of the first surface and the second surface and is configured to pass through light having a first linear polarization state and reflect light having a second linear polarization state that is orthogonal to the first linear polarization state. The beam splitter is disposed on one of the third surface and the fourth surface and is configured to partially transmit and partially reflect light incident onto the beam splitter. An optical cavity of at least one of the first lens and the second lens is formed between the reflective polarizer and the beam splitter. The optical system is configured to direct light from a display device to a viewing area, a path of the light from the display device traveling through the optical cavity a plurality of times.

Aspects of the disclosure provide an optical system. The optical system includes a first lens including a first optically transparent member having a first surface and a second surface, a second lens including a second optically transparent member having a third surface and a fourth surface, and a vision correction adapter. At least one of the first lens or the second lens is flexible, a center region of the vision correction adapter includes an opening, and the vision correction adapter is configured to perform a plurality of (i) altering a distance between the first lens and the second lens to correct for one of nearsightedness and farsightedness (ii) altering at least one of a shape of the first lens or a shape of the second lens to conform to a shape of the vision correction adapter to correct for astigmatism and (iii) tilting at least one of the first lens or the second lens according to the shape of the vision correction adapter to correct for double vision.

In an example, the vision correction adapter is configured to alter the distance between the first lens and the second lens to correct for the one of nearsightedness and farsightedness. A thickness of the vision correction adapter is based on a degree of the one of nearsightedness or farsightedness. The vision correction adapter includes a band and a curved surface, and the vision correction adapter is configured to perform at least one of: (i) altering the at least one of the shape of the first lens or the shape of the second lens to conform to the shape of the vision correction adapter to correct for the astigmatism, and (ii) tilting the at least one of the first lens or the second lens according to the shape of the vision correction adapter to correct for double vision.

In an example, the vision correction adapter is configured to alter the at least one of the shape of the first lens or the shape of the second lens to conform to the shape of the vision correction adapter to correct for the astigmatism, and the vision correction adapter is configured to tilt the at least one of the first lens or the second lens according to the shape of the vision correction adapter to correct for double vision.

In an example, the first lens and the second lens are flexible, the vision correction adapter includes a curved surface and a tilted surface, a shape of the curved surface is based on a degree of the astigmatism and an orientation of the astigmatism, the curved surface is configured to alter the shape of the first lens to conform to the shape of the curved surface to correct for the astigmatism, the tilted surface is tilted with respect to an optical axis of the optical system, a tilt angle and an orientation of the tilted surface are based on double vision, and the vision correction adapter is configured to tilt the second lens according to the tilt angle and the orientation of the tilted surface to correct for the double vision.

In an example, the first lens is flexible, the vision correction adapter includes a curved surface, a shape of the curved surface is based on a degree of the astigmatism and an orientation of the astigmatism, the curved surface is configured to alter the shape of the first lens to conform to the shape of the curved surface to correct for the astigmatism, the curved surface is tilted with respect to an optical axis of the optical system, a tilt angle and an orientation of the curved surface are based on double vision, and the vision correction adapter is configured to tilt the first lens according to the tilt angle and the orientation of the curved surface to correct for the double vision.

Aspects of the disclosure provide a method of fabricating a vision correction adapter for an optical system. The method can include obtaining vision correction information for at least one of nearsightedness, farsightedness, astigmatism, or double vision and determining one or more of (i) a thickness of the vision correction adapter or (ii) a shape of the vision correction adapter based on the vision correction information. The method can further include fabricating the vision correction adapter based on the determined one or more of the thickness of the vision correction adapter or the shape of the vision correction adapter. A center region of the vision correction adapter can be hollow.

In an example, the fabricated vision correction adapter is configured to space apart a first lens and a second lens in the optical system to correct for the at least one of the nearsightedness, the farsightedness, the astigmatism, or the double vision.

In an example, the thickness of the vision correction adapter is determined based on the nearsightedness or the farsightedness, and the first lens and the second lens are spaced apart by the thickness of the vision correction adapter to correct for the nearsightedness or the farsightedness.

In an example, the first lens is flexible. The shape of the vision correction adapter is determined based on a degree of the astigmatism and an orientation of the astigmatism, and the fabricated vision correction adapter is positioned to alter a shape of the first lens to conform to the shape of the vision correction adapter to correct for the astigmatism.

In an example, the shape of the vision correction adapter is determined based on the double vision, the shape of the vision correction adapter indicates a tilt angle and an orientation of a tilted surface of the vision correction adapter, and the fabricated vision correction adapter is positioned to tilt the first lens according to the tilt angle and the orientation of the tilted surface of the vision correction adapter to correct for the double vision.

BRIEF DESCRIPTION OF THE DRAWINGS

Further features, the nature, and various advantages of the disclosed subject matter will be more apparent from the following detailed description and the accompanying drawings in which:

FIG. 5D shows examples of vision correction to correct for nearsightedness and farsightedness.

FIG. 6B shows examples to correct for astigmatism.

FIG. 8B shows examples to correct for double vision.

DETAILED DESCRIPTION OF EMBODIMENTS

Figure 1:
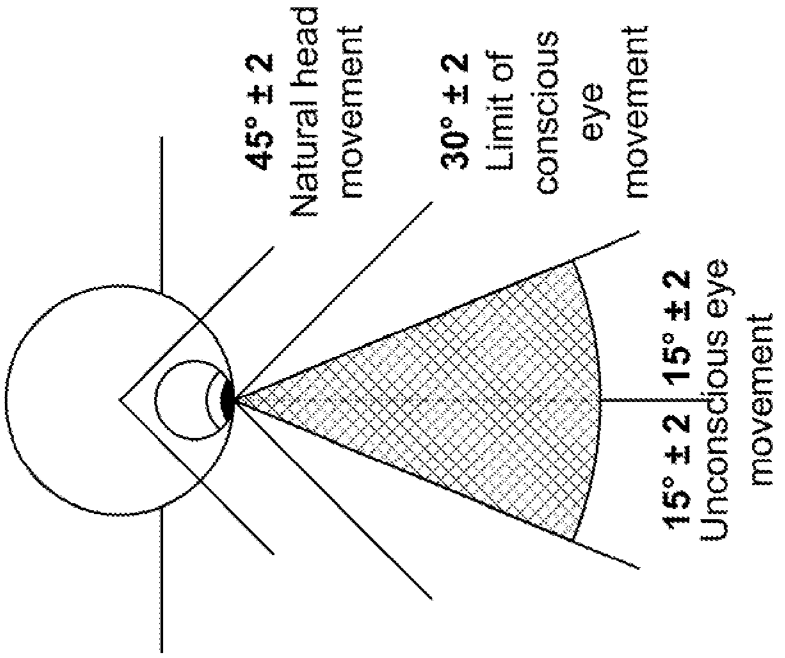
FIG. 1 shows examples of eye rotations and head rotations.

A display system can include an optical system that directs light beams from an object on a display device (e.g., an image displayed on the display device) or a real object to a light receiver. The optical system can form an image (e.g., a virtual image) on an image plane based on the light beams. In an embodiment, the light receiver is an eye of a user. If a lens of the eye of the user can form an image on a retina of the eye based on the virtual image on the image plane (or the directed light beams from the display device), the eye can see the object clearly, and the eye has no vision defects. Eye characteristics, such as visual acuity (or sharpness of vision), can vary greatly among users of the display system. When the display system is used by various users or a user with changing or different eye conditions, such as various vision defects (e.g., nearsightedness (or myopia), farsightedness (or hyperopia), astigmatism, and/or double vision), eyes of certain users with vision defects may form images in front of or behind retinas, and certain users may not see objects displayed on the display device or real objects clearly without vision correction, and the eyes have vision defects.

Vision correction may be performed by the display system. The optical system can include at least one lens. Surface(s) of the at least one lens can be flexed or bent such that a surface of the at least one lens can have differing shapes and optical powers in two different axes (e.g., X and Y axes) to correct for astigmatism. The at least one lens can be tilted with respect to an axis (e.g., an optical axis of the optical system or an axis perpendicular to the optical axis) to correct for double vision. The at least one lens can include a first lens and a second lens, and a distance between the first lens and the second lens can be adjusted to correct for myopia or hyperopia.

According to an embodiment of the disclosure, a vision correction adapter (e.g., a prescription correction lens adapter) can be used in the optical system to achieve the vision correction. The at least one lens can include the first lens. A shape of the vision correction adapter can be based on astigmatism (e.g., a degree of astigmatism and an orientation of the astigmatism), and the vision correction adapter can be configured to alter a shape of the first lens to conform to the shape of the vision correction adapter to correct for the astigmatism.

A tilted surface of the vision correction adapter can be tilted, for example, with respect to an axis (e.g., the optical axis of the optical system or an axis that is perpendicular to the optical axis). A tilt angle and an orientation of the tilted surface of the vision correction adapter can be based on double vision (e.g., a degree of double vision and an orientation of double vision), and the vision correction adapter can be positioned against the first lens such that the first lens is tilted according to the tilt angle and the orientation of the tilted surface of the vision correction adapter to correct for the double vision.

The at least one lens can include the first lens and the second lens. The vision correction adapter can be positioned between the first lens and the second lens, the first lens and the second lens can be spaced apart by a thickness of the vision correction adapter, and the thickness of the vision correction adapter can be selected to correct for one of nearsightedness or farsightedness.

The vision correction adapter can be used to correct for a single vision defect, such as described above. The vision correction adapter can also be used to correct for multiple vision defects. For example, the thickness of the vision correction adapter that spaces apart the first lens and the second lens and the shape of the vision correction adapter can be determined such that (i) nearsightedness or farsightedness, (ii) astigmatism, and/or (iii) double vision can be corrected for. The shape of the vision correction adapter can be determined based on astigmatism and/or double vision.

In an example, the optical system and the display device can be configured to be positioned within a distance threshold (e.g., 35 mm) of an eye of a user, and the display system can be referred to as a near eye display (NED) system. For example, the display system is a head mounted display (HMD) system worn by a user.

Considering human factors, such as human vision (e.g., a field of view (FOV) of a human eye, eye rotation), head rotation, and the like may help design optical parameters of a display system. An optical design with a high resolution over a range of eye rotations can make a viewing experience of a user more natural.

Unconstrained or unconscious eye rotation can be less than 20°. FIG. 1 shows examples of eye rotations and head rotations. A horizontal unconscious eye rotation can be less than a value (e.g., 20°) from a center to a left side or a right side, such as 15°±2°. A horizontal conscious eye rotation can be larger than that of the horizontal unconscious eye rotation. In an example, the horizontal conscious eye rotation is up to a value, such as 30°±2°. In another example, an eye can rotate approximately 28°±8° up, and 47°±8° down. FIG. 1 also shows an example of a natural head movement. In an example, the natural head movement is 45°±2° horizontally.

In an example, humans have a slightly over 210° forward-facing horizontal arc of visual fields without eye movements. A horizontal FOV of both human eyes can be 210°. A vertical range of the visual field (or the vertical FOV) in humans is around 150°.

Figure 2:
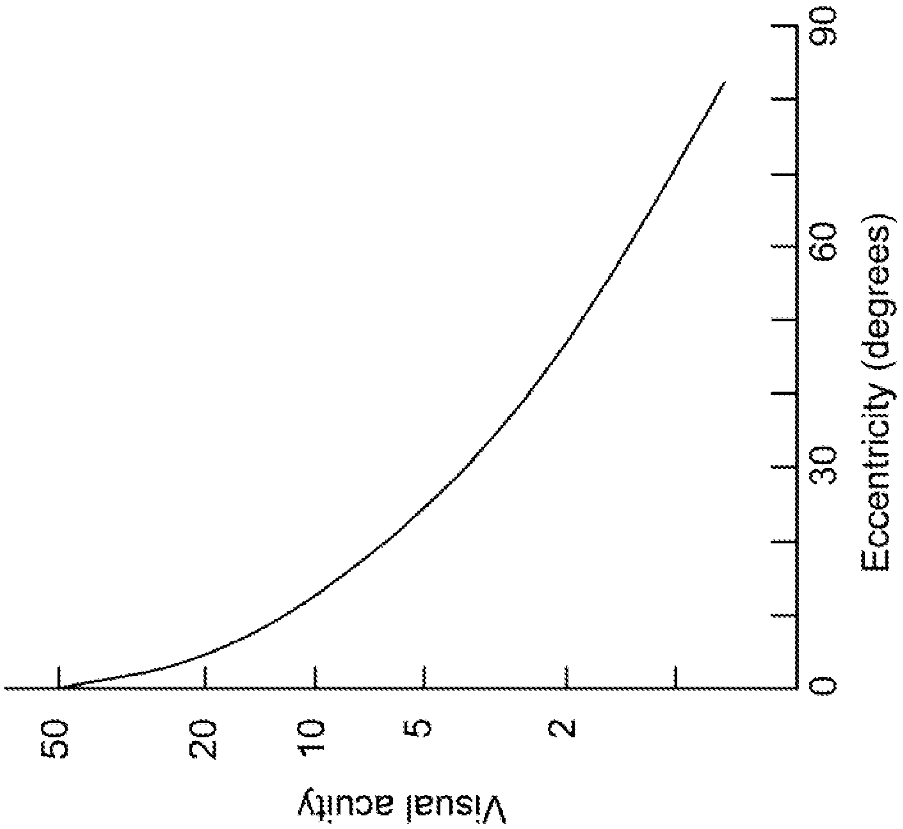
FIG. 2 shows a relationship between visual acuity and eccentricity.

A human eye is not a perfect lens over a large FOV. Visual acuity can indicate clarity or sharpness of vision. An eccentricity can refer to an angular distance from a center of a visual field or from the foveola of a retina. FIG. 2 shows a relationship between visual acuity (including peripheral visual acuity) and eccentricity. The visual acuity can decrease with the eccentricity. Accordingly, a resolution of an optical system in a peripheral field can be lower than a resolution of the optical system in a center field because eyes lack visual acuity in the peripheral field without eye rotation to gaze directly to the peripheral field. Considering visual acuity can avoid overdesign of an optical system.

Vision correction can be applied to correct vision defects in various viewers. FIGS. 3A-3G shows examples of vision defects and vision correction methods according to embodiments of the disclosure. Vision defects can include nearsightedness (or myopia), farsightedness (or hyperopia), astigmatism, double vision (or diplopia), and the like.

Figure 3A:
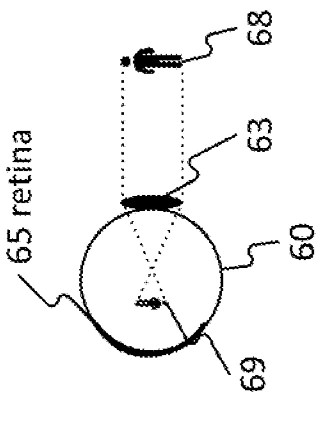
FIGS. 3A-3B show an example of nearsightedness (or myopia) and a vision correction method to correct for the nearsightedness.
Figure 3C:
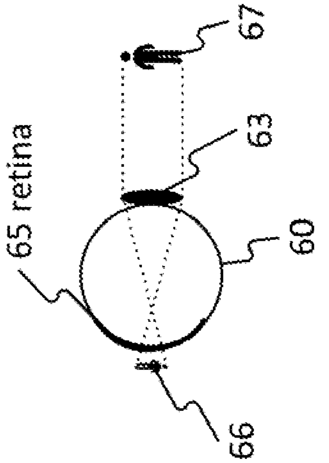
FIGS. 3C-3D show an example of farsightedness (or hyperopia) and a vision correction method to correct for the farsightedness.
Figure 3E:
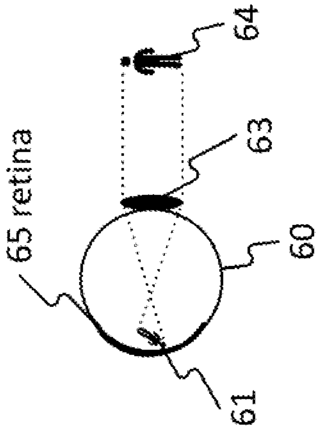
FIGS. 3E-3F show an example of astigmatism and a vision correction method to correct for the astigmatism.
Figure 3B:
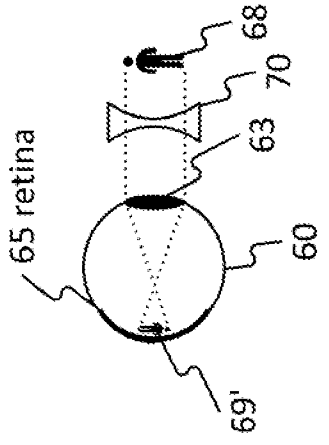

FIGS. 3A-3B show an example of nearsightedness (or myopia) and a vision correction method to correct for the nearsightedness. Referring to FIG. 3A, nearsightedness can refer to an inability of an eye (60) to see a distant object (68) clearly while the eye (60) can see a close object clearly. A lens (63) of the eye (60) can over-converge nearly parallel rays from the distant object (68), and the rays intersect in front of the retina (68) and forms an image (69) in front of the retina (68). More divergent rays from a close object can be converged on the retina (65) to form a clear image. A distance to the farthest object that can be seen clearly can be referred to as a far point of the eye (60). A distance between the distant object (68) and the eye (60) can be larger than the far point of the eye (60). A distance between the close object and the eye (60) can be less than the far point of the eye (60).

Referring to FIG. 3B, in an example, the nearsightedness can be corrected for by placing a diverging lens (or a diverging spectacle lens) (70) in front of the eye (60). The diverging lens (70) and the lens (63) can form an image (69') on the retina (65) from the distant object (68), and the eye (60) can see clearly the distant object (68).

Figure 3D:
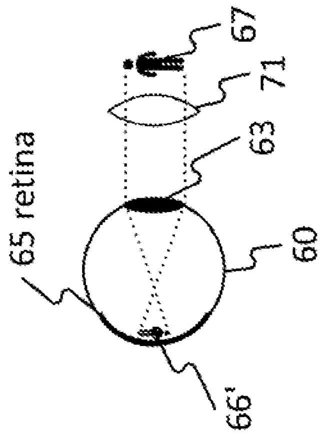

FIGS. 3C-3D show an example of farsightedness (or hyperopia) and a vision correction method to correct for the farsightedness. Referring to FIG. 3C, farsightedness can refer to an inability of the eye (60) to see a close object (67) clearly while the eye (60) can see a distant object clearly. The lens (63) of the eye (60) does not converge sufficiently rays from the close object (67) to make the rays intersect on the retina (65), and thus an image (66) forms behind the retina (68). Less diverging rays from a distant object can be converged on the retina (65) and forms a clear image. A distance to the closest object that can be seen clearly can be referred to as a near point (e.g., 25 cm) of the eye (60). A distance between a distant object and the eye (60) can be larger than the near point of the eye (60). A distance between the close object (67) and the eye (60) can be less than the near point of the eye (60).

Referring to FIG. 3D, in an example, the farsightedness can be corrected for by placing a converging lens (or a converging spectacle lens) (71) in front of the eye (60). The converging lens (71) and the lens (63) can form an image (66') on the retina (65) from the close object (67), and the eye (60) can see clearly the close object (67).

Figure 3F:
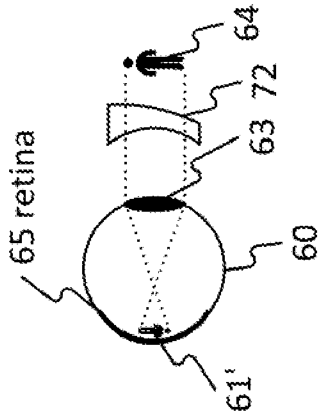

FIGS. 3E-3F show an example of astigmatism and a vision correction method to correct for the astigmatism. Referring to FIG. 3E, astigmatism can refer to a type of refractive error due to rotational asymmetry in a refractive power of the eye (60). Astigmatism may result in a distorted vision or a blurred vision for an object located at any distance. Astigmatism can include simple hyperopic astigmatism, simple myopic astigmatism, and the like. In an example of the simple hyperopic astigmatism, a first focal line is on the retina (65), and the second focal line is located behind the retina (65). In an example of the simple myopic astigmatism, a first focal line is in front of the retina (65), while the second focal line is on the retina (65). Referring to FIG. 3E, a part of an object (64) is imaged onto the retina (65) and another part of the object (64) is imaged outside of the retina (65) to form an image (61).

Referring to FIG. 3F, in an example, astigmatism can be corrected for by placing a cylindrical lens (72) in front of the eye (60). The cylindrical lens (72) and the lens (63) can image the object (64) onto the retina (65) to form an image (61'). Glasses to correct for astigmatism can be fitted with corrective cylindrical lenses that help to properly refract light onto the retina (65) of the eye (60).

Diplopia can refer to a simultaneous perception of two images of a single object. The two images may be displaced or shifted in relation to each other, for example, horizontally or vertically. Due to double vision, the single object can be imaged onto two images that partially overlap. A binocular double vision (or binocular diplopia) can refer to a type of double vision where the two images are seen by two eyes of a viewer, respectively, and the two images are perceived by the viewer as shifted from each other or partially overlapped.

A lens which includes a prism correction (e.g., prism glasses) can correct for the double vision, such as the binocular double vision. In an example, through prism correction, one (e.g., seen by a right eye) of the two images can be shifted with respect to another image (e.g., seen by a left eye) of the two images such that the double images can be merged into a single clear image. Prism glasses have lenses that are made of prisms can bend light, before the light hits a retina to shift an image position. The lens including the prism correction can displace a viewed image horizontally, vertically, or along any suitable direction (e.g., a combination of both directions). By moving the image in front of a deviated eye, double vision (e.g., the binocular double vision) can be corrected.

Figure 3G:
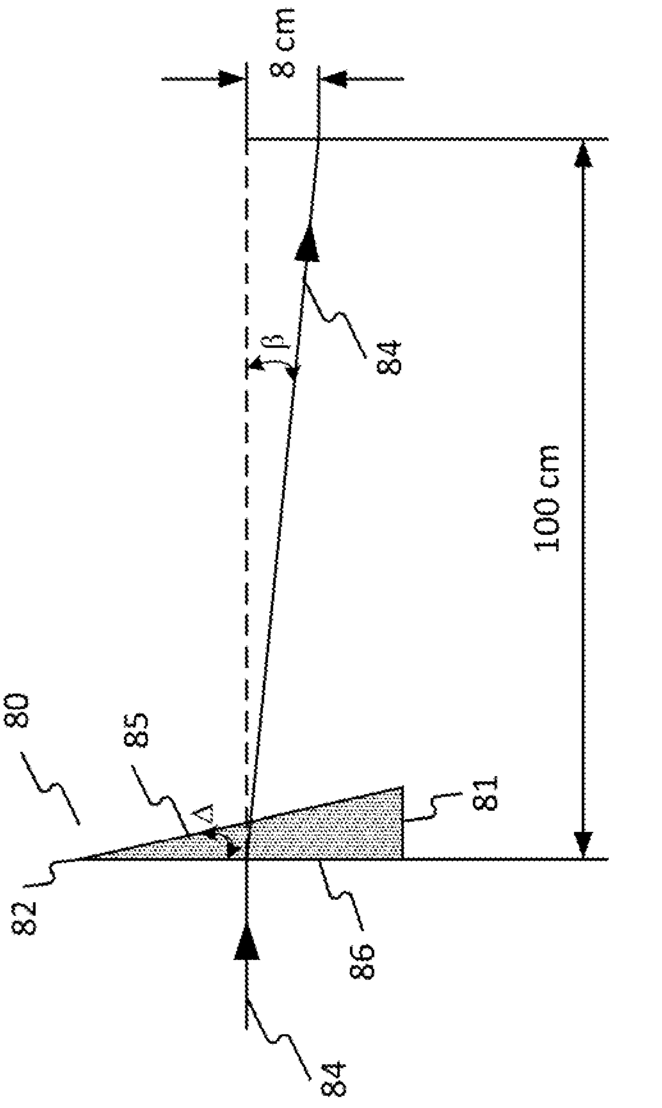
FIG. 3G shows an exemplary prism used to correct for double vision according to an embodiment of the disclosure.

Prism correction can be measured by two parameters, a prism diopter (PD) and a prism orientation or direction indicated by a position of a base. FIG. 3G shows a prism (80) used to correct for double vision. The prism (80) has two edges including a base (81) and an apex (82). The base (81) can be the thickest part (e.g., the thickest edge) of the prism (80) and can be opposite to the apex (82). Light can be bent towards the base (81) and an image can be shifted towards the apex (82).

In an example, the prism orientation includes a base out (BO) indicating the base (81) pointing towards a wearer's ear, a base in (BI) indicating the base (81) pointing towards a wearer's nose, a base up (BU) indicating the base (81) pointing up, and a base down (BD) indicating the base (81) pointing down.

A prism diopter can indicate a prism power or an amount of prism correction to correct for double vision. A prism diopter can indicate prismatic deflection. The prism diopter can depend on a prism angle or apex angle. The prism angle can be an angle $\Delta$ between two surfaces (85)-(86) at which a light beam (84) enters and leaves the prism (80).

Referring to FIG. 3G, the light beam (84) incident onto the surface (86) of the prism (80) is deflected by the prism (80) and comes out of from the surface (85) of the prism (80) with a deflected angle $\beta$. The deflected angle $\beta$ can depend at least on the prism angle $\Delta$. In an example, a prism diopter of 1 (or $1\Delta$ or 1 PD) indicates 1 unit of displacement of the bent light beam measured at 100 units from the prism (80). Referring to FIG. 3G, a prism diopter of 1 can indicate a 1 cm displacement of the light beam (84) at 100 cm (1 meter). The prism (80) can have a prism diopter of 8 deflect the light beam (84) 8 cm on a plane placed at a distance of 1 m.

Bending a lens may correct vision defects such as astigmatism. In some examples, a bending profile of the bent lens may not be controlled accurately to correct vision defects such as astigmatism. According to some embodiments of the disclosure, a vision correction adapter, such as a mechanical adapter, can be configured to bend and/or shift a lens (e.g., a plastic curved mirror) in a catadioptric VR optical system and to enable correction of vision defects including farsightedness, nearsightedness, astigmatism, and/or double vision. By controlling a shape of the vision correction adapter (e.g., the mechanical adapter) and positioning the vision correction adapter adjacent to a lens, a shape of the lens can be controlled more accurately than bending the lens without the vision correction adapter.

Figure 4A:
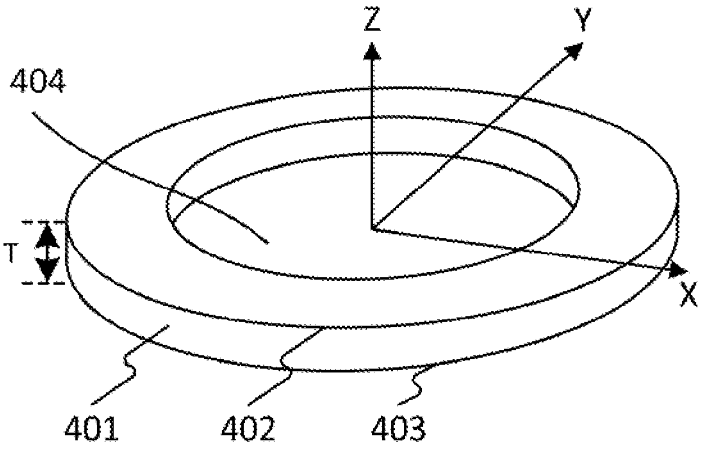
FIGS. 4A-4H show examples of vision correction adapters.
Figure 4B:
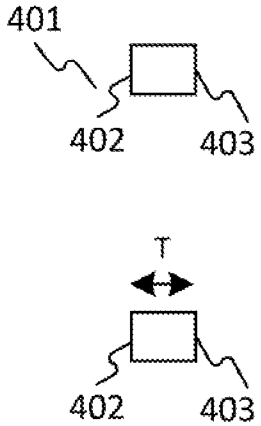

FIGS. 4A-4H show examples of vision correction adapters. FIGS. 4A-4B show an example of a vision correction adapter (401) used to correct for nearsightedness or farsightedness according to an embodiment of the disclosure. FIG. 4B shows a side view of the vision correction adapter (401) in the XZ plane or in the YZ plane. A center region of the vision correction adapter (401) can include an opening (404). A thickness of the vision correction adapter (401) can be selected to correct for nearsightedness or farsightedness. The thickness of the vision correction adapter can vary with a degree of nearsightedness or a degree of farsightedness. In an example, the vision correction adapter (401) is a circular band (or is ring-shaped) between two surfaces (402)-(403). The two surfaces (402)-(403) can have any suitable shape(s). In the example in FIGS. 4A-4B, the two surfaces (402)-(403) are parallel surfaces, for example, parallel to the XY plane. The vision correction adapter (401) can be positioned between a first lens and a second lens in an optical system such that the first lens and the second lens are spaced apart by the thickness T of the vision correction adapter (401) to control an optical power of the optical system and correct for nearsightedness or farsightedness, such as shown in FIGS. 5A-5D.

An optical power can indicate a degree to which an optical system or an optical component (e.g., a lens or a curved mirror) converges or diverges light. In an example, the optical power of the optical component or system is indicated by a parameter a diopter (or an optical diopter). The diopter can be equal to a reciprocal of a focal length f of the optical component or system. A higher optical power indicates (i) a stronger focusing power for a converging optical component/system or (ii) a stronger diverging power for a diverging optical component/system.

A parameter relative diopter can indicate a difference between a first diopter of the optical system with a vision correction and a second diopter of the optical system without the vision correction. A relative diopter can indicate a degree of vision correction to (i) nearsightedness or farsightedness or (ii) astigmatism.

Figure 5A:
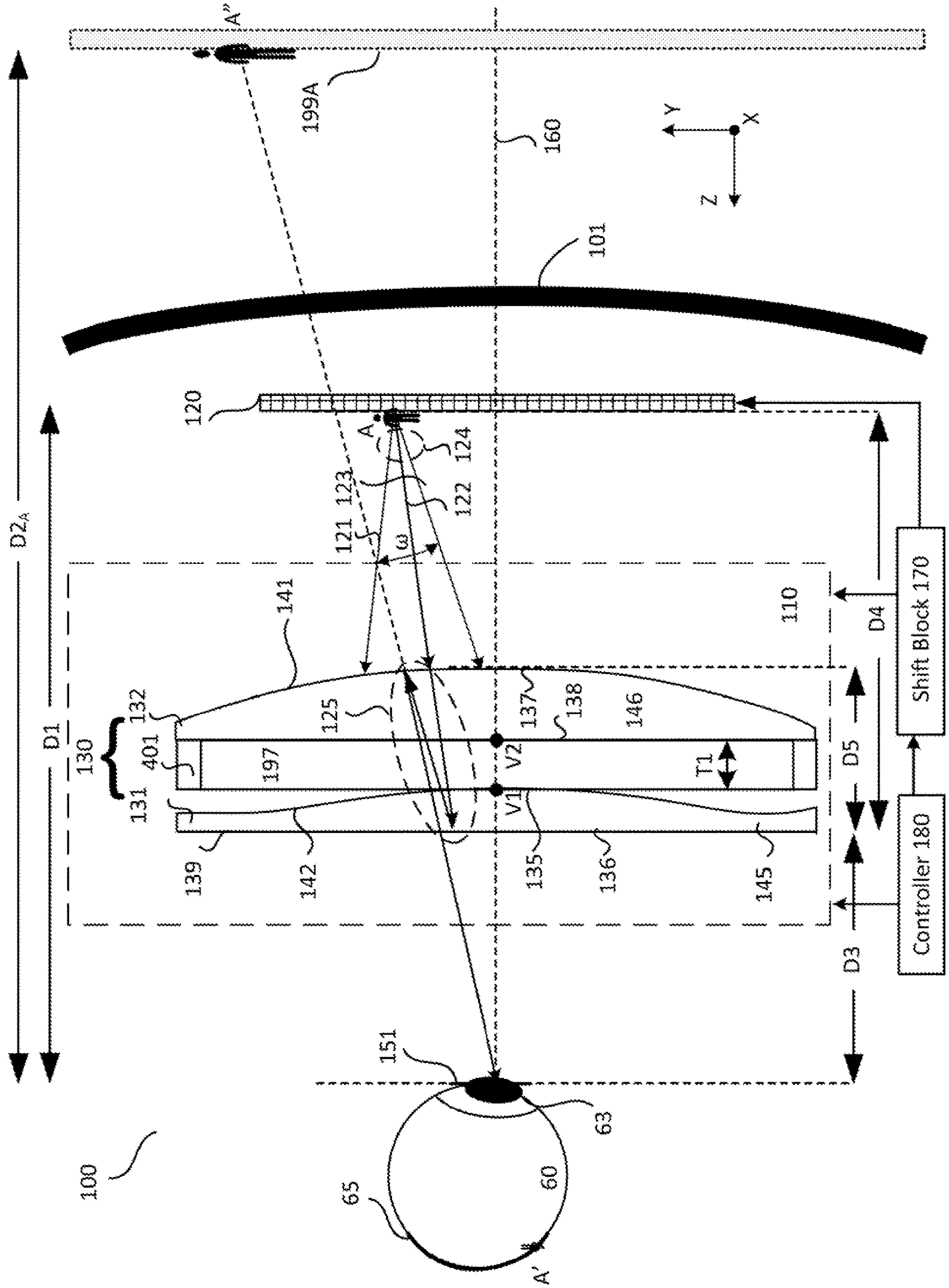
FIGS. 5A-5C show a display system in a side view according to some embodiments of the disclosure.
Figure 5B:
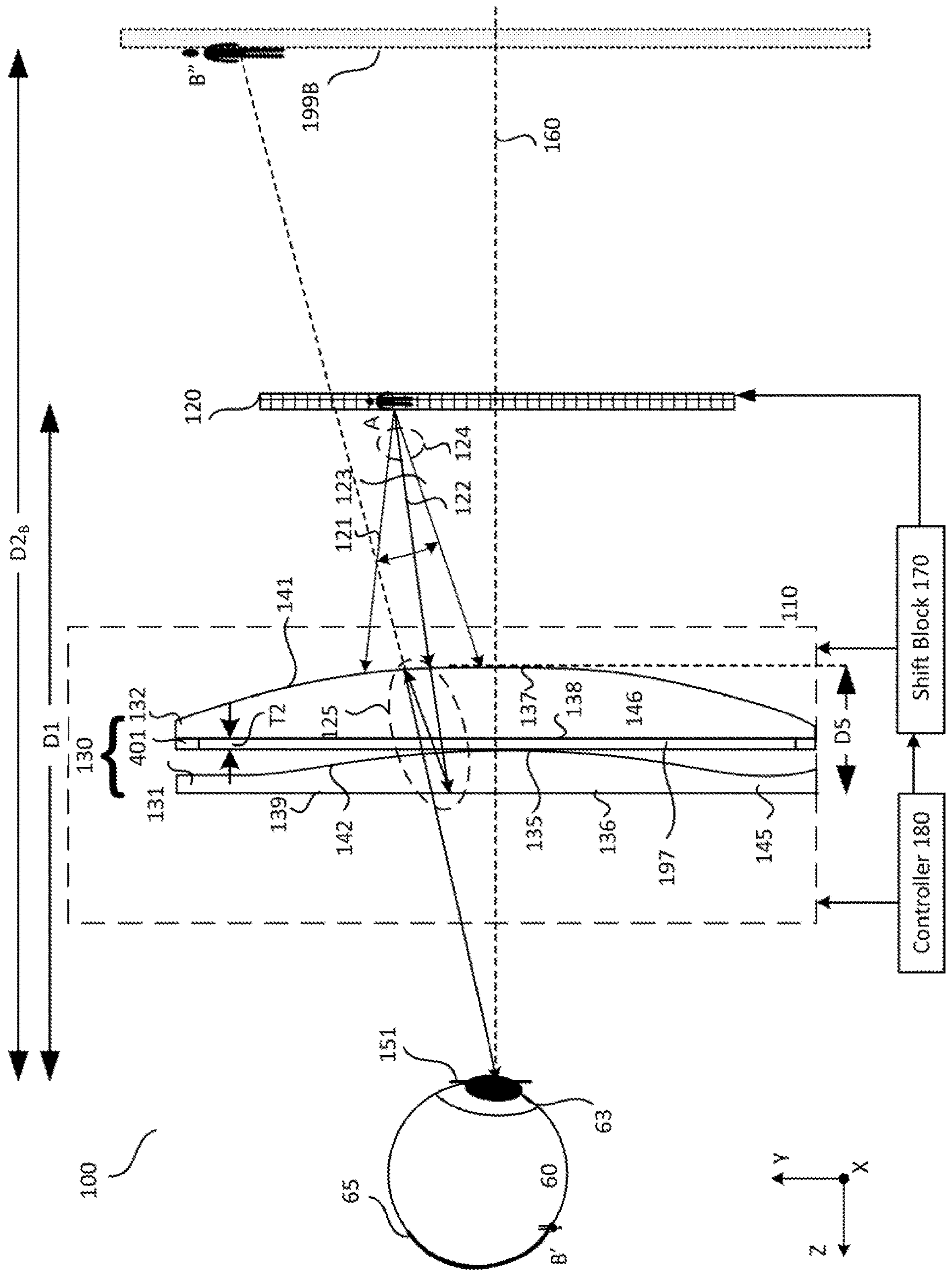
Figure 5C:
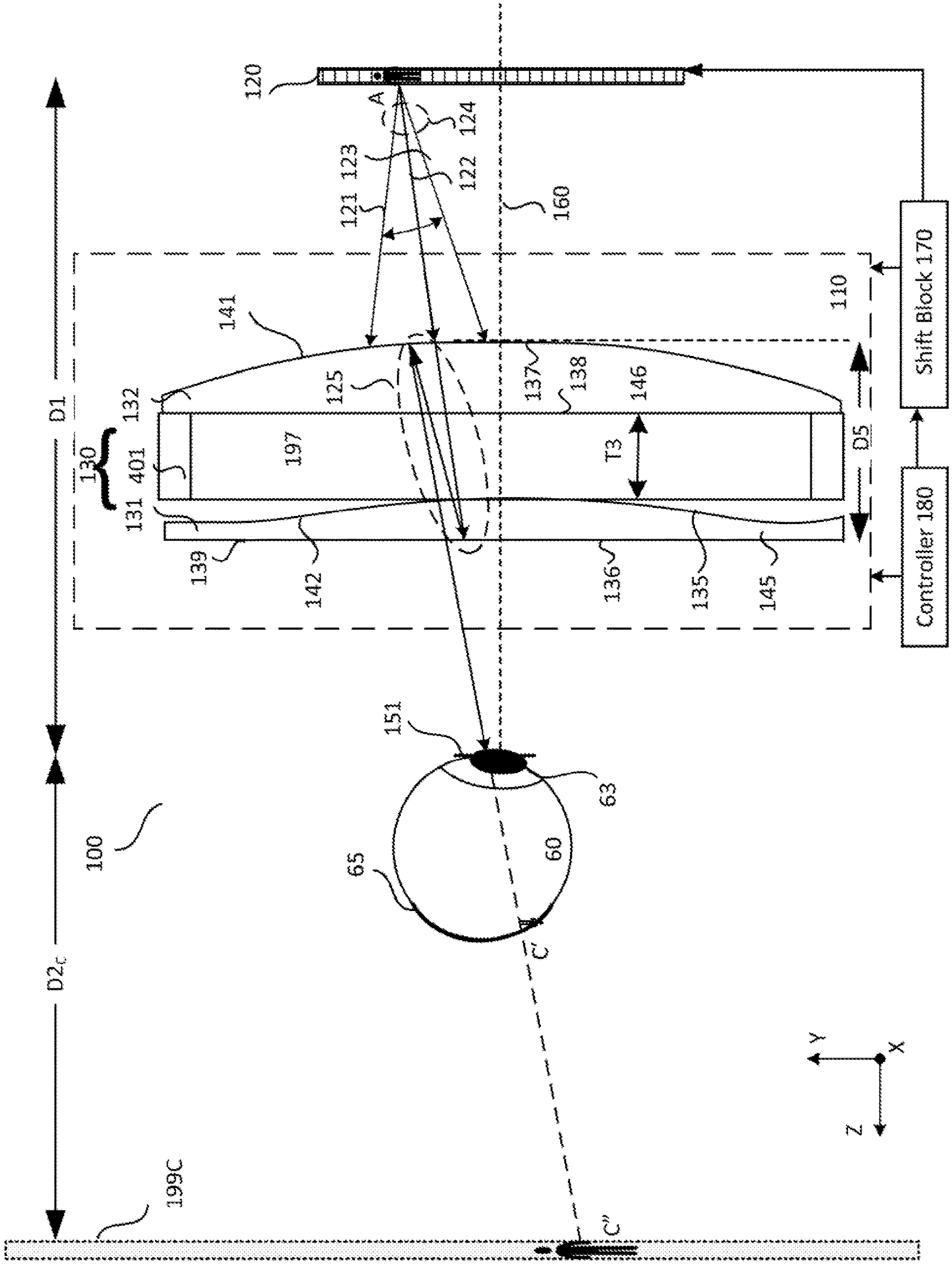

FIGS. 5A-5C show a display system (e.g., a near eye display system) (100) in a side view according to some embodiments of the disclosure. The display system (100) includes an optical system (110), a display device (120), a shift block (170), a controller (180), and/or the like. The optical system (110) can include any suitable optical elements, such as diffractive elements (gratings and prisms), refractive elements (lenses), guiding elements (e.g., planar waveguides and/or fibers), polarizing elements (e.g., polarizers, half-wave plates, quarter-wave plates, polarization rotators, Pancharatnam-Berry (PB) Phase lens, and the like), and/or the like.

The optical system (110) can include a lens system (130), a beam splitter (BS) (141), a reflective polarizer (139), and/or the like. In an example, the optical system (110) includes a waveplate, such as a quarter-wave plate (QWP) (142). The display device (120) can include a pixel array configured to emit light beams and display images. The optical system (110) can direct the emitted light beams from an object A (e.g., an image A displayed on the display device (120)) on the display device (120) or a real object to a viewing position or an area (or a viewing area) (151) located at the viewing position. In an example, the area (151) is located in an XY plane. In an example, the area (151) is referred to as an exit pupil of the display system (100). The XY plane includes an X axis and the Y axis that is orthogonal to the X axis. A light receiver or detector, such as an eye (60) of a user or the like, can be located at the area (151). In an example, a lens (63) in the eye (60) forms an image A' on a retina (65) of the eye (60) based on the object A, and the eye (60) perceives the object A on the display device (120) as a virtual image A" on an image plane (199A) in FIG. 5A. The virtual image A" appears at a distance $D2_A$ from the area (151) and appears larger than the image A on the display device (120). The distance $D2_A$ is larger, and in some cases much larger, than a distance D1 between the area (151) and the display device (120).

An optical cavity can be formed between the beam splitter (141) and the reflective polarizer (139). In the example shown in FIG. 5A, the optical cavity can include the lens system (130) and the QWP (142). As described below, an optical path of a light ray in a light beam can be folded in the optical cavity between the beam splitter (141) and the reflective polarizer (139). Accordingly, the display system (100) can be a NED system (e.g., an HMD system worn by a user), and the optical system (110) and the display device (120) can be positioned within a distance threshold (e.g., 35 mm) of an eye of a user (e.g., the eye (60)).

The lens system (130) can include one or more lenses, such as a first lens (131) and a second lens (132). The first lens (131) can include an optically transparent member (145) having two opposite surfaces (135)-(136). The second lens (132) can include an optically transparent member (146) having two opposite surfaces (137)-(138). An optical axis (160) of the lens system (130) can be parallel to a Z axis that is perpendicular to the XY plane. The first lens (131) and the second lens (132) can have circular symmetry around the optical axis (160). For example, in FIG. 5A, a first optical power of the first lens (131) along the X axis is equal to a second optical power of the first lens (131) along the Y axis, and a first optical power of the second lens (132) along the X axis is equal to a second optical power of the second lens (132) along the Y axis.

Surfaces of the one or more lenses in the lens system (130), such as the surfaces (135)-(138), can have any suitable shapes or surface curvatures, such as planar shape(s) parallel to the XY plane, spheric shape(s) with any suitable radius of curvature, aspheric shape(s), or other shape(s). One or more of the surfaces (135)-(138) can be smooth. One or more of the surfaces (135)-(138) can be grooved, for example, including a microstructure, such as a Fresnel structure. Shapes of the surfaces (135)-(138) can be determined based on design parameters, such as focal lengths, aberration requirements, lens thicknesses, flatness(es) of the lenses, and the like. The one or more lenses can include converging and/or diverging lens(es). The second lens (132) can be a spheric-spheric lens, a plano-spheric lens, an aspheric-spheric lens, an aspheric-aspheric lens, or the like. In the example of FIG. 5A, the surface (136) of the first lens (131) is planar. The first lens (131) can be a plano-aspheric lens. The second lens (132) can be a plano-spheric lens. In an example, the first lens (131) and the second lens (132) are converging lenses having respective positive focal lengths.

The optically transparent members (145)-(146) can include any suitable material(s) including but not limited to glass (e.g., borosilicate glass, dense flint glass), polymer, plastic material(s), such as poly(methyl methacrylate) (PMMA), polyimide, acrylic, styrene, cyclic olefin polymer, cyclic olefin co-polymer, polycarbonate, and/or the like. A glass lens can be fabricated by grinding and polishing, a glass molding method, and/or the like. A polymer or plastic lens can be fabricated by diamond turning, polishing, injection molding, casting, and/or the like.

In some embodiments, one or more lenses in the lens system (130) can be flexible. A lens (e.g., the first lens (131) or the second lens (132)) can be made flexible by having a thickness less than a threshold (e.g., being mechanically thin) to add flexibility. The optically transparent member (145) and/or the optically transparent member (146) can include cyclic olefin copolymer (COC) and/or PMMA to improve durability and/or flexibility.

The BS (141) and the reflective polarizer (139) can be disposed between the area (151) and the display device (120). The quarter-wave plate (142) can be disposed between the beam splitter (141) and the reflective polarizer (139). Anti-reflection (AR) coating(s) can be applied to any suitable surface(s) of the optical system (110) to reduce unwanted reflections of the light beams, for example, to reduce or eliminate ghosting due to the multi-reflections at various interfaces. The BS (141), the reflective polarizer (139), and/or the quarter-wave plate (142) can be thin-film optical component(s), for example, including one or more layers of optical films. A thickness (e.g., a maximum thickness or an average thickness) of a thin-film optical component (e.g., the BS (141), the reflective polarizer (139), or the quarter-wave plate (142)) can be less than a thickness threshold, such as 200 microns, 100 microns, or the like. A thin-film optical component (e.g., the BS (141), the reflective polarizer (139), or the quarter-wave plate (142)) can be disposed onto a surface of the first lens (131) or the second lens (132). A shape of the thin-film optical component (e.g., the BS (141), the reflective polarizer (139), or the quarter-wave plate (142)) can conform substantially or completely to a shape of a surface of the first lens (131) or the second lens (132).

The reflective polarizer (139) can be configured to pass through a light beam having a first linear polarization state and reflect a light beam having a second linear polarization state. The second linear polarization state is orthogonal to the first linear polarization state. The reflective polarizer (139) can be formed on a surface (e.g., (136)) in the lens system (130). The reflective polarizer (139) can be disposed onto the surface (136) of the first lens (131). A shape of the reflective polarizer (139) can conform substantially or completely to a shape (e.g., a planar shape, a spheric shape, an aspheric shape, or the like) of the surface (136) of the first lens (131). In the example shown in FIG. 5A, a shape of the reflective polarizer (139) is planar.

The beam splitter (141) can be configured to partially transmit and partially reflect light beams incident onto the beam splitter (141). The beam splitter (141) can have an average optical transmittance T and an average optical reflectance R. In an example, a sum of T and R is 1 (i.e., 100%) over a wavelength range (e.g., 380 to 780 nanometers (nm)). The average optical transmittance T and the average optical reflectance R of the beam splitter (141) can be referred to as T/R. T or R can be in a range (e.g., from 40% to 60%). In an example, the beam splitter (141) has T/R of 40/60, 50/50, or 60/40. For example, if T and R are 50%, the beam splitter (141) transmits 50% and reflects 50% of the light beams incident onto the beam splitter (141). The beam splitter (141) partially transmits and partially reflects light beams from the display device (120) or a real object. In an example, the BS (141) is disposed onto the surface (137) of the second lens (132). The surface (137) of the second lens (132) can have any suitable shape, such as aspheric or spheric. A shape of the BS (141) can conform substantially or completely to a shape (e.g., a spheric shape or an aspheric shape) of the surface (137) of the second lens (132).

A polarization state of a light beam can be altered as the light beam passes through certain optical elements. In an embodiment, a polarization state of a light beam can be altered by a waveplate or a retarder as the light beam travels through the waveplate. The quarter-wave plate (142) can alter a polarization state of a light beam traveling through the quarter-wave plate (142), for example, by 900 or $\pi/2$. In an example, the quarter-wave plate (142) converts linearly polarized light into circularly polarized light or circularly polarized light into linearly polarized light. The quarter-wave plate (142) can be formed on the surface (135) in the lens system (130).

A light beam can be randomly polarized if the light beam includes a rapidly varying succession of different polarization states. A light beam can be polarized, such as linearly polarized (e.g., in a linear polarization state), circularly polarized (e.g., in a circular polarization state), elliptically polarized (e.g., in an elliptical polarization state), or the like. For the linearly polarized light, an electric field vector of the light beam is along a particular line. For the circularly polarized light, an electric field vector of the light beam rotates, e.g., clockwise or counter-clockwise as seen by an observer toward whom the light beam is propagating.

Degree of polarization (DOP) is a quantity that indicates a portion of an electromagnetic wave (e.g., a light beam) that is polarized. A perfectly polarized wave can have a DOP of 100%, and an unpolarized wave can have a DOP of 0%. A partially polarized wave can be represented by a superposition of a polarized component and an unpolarized component, and thus can have a DOP between 0 and 100%. DOP can be calculated as a fraction of a total power that is carried by the polarized component of the wave (e.g., a light beam).

A light beam (e.g., the light beam generated from each pixel in the display device (120)) can have any suitable polarization state(s) or DOP. In an example, the light beam is circularly polarized having a DOP of 100%. In an example, the light beam is predominantly circularly polarized having a relatively large DOP that is above a threshold (e.g., 80% or above), such as a superposition of (i) a circularly polarized component and (ii) an unpolarized component and/or another polarization component. A circularly polarized light beam having a DOP of 100% or a predominantly circularly polarized light beam having a relatively large DOP can be referred to as a circularly polarized light beam in the disclosure. In an example, a light beam is linearly polarized having a DOP of 100% or predominantly linearly polarized having a relatively large DOP that is above a threshold. A linearly polarized light beam having a DOP of 100% or a predominantly linearly polarized light beam having a relatively large DOP can be referred to as a linearly polarized light beam in the disclosure.

The display device (120) can include a pixel array. In some examples, the pixel array includes multiple pixels arranged to form a two-dimensional surface. The two-dimensional surface of the display device (120) can be substantially flat or planar, can be curved, or can include a combination of flat and planar panels. The display device (120) can be a display panel. The display device (120) can include any suitable type(s) of display panel(s), such as a liquid crystal display (LCD) panel(s), an organic light emitting diode (OLED) panel(s), and/or the like. A resolution of the display device (120) can be defined according to pixels in the two dimensions or one of the two dimensions of the two-dimensional surface. Each pixel in the pixel array can generate a light beam. Each light beam can include a bundle of light rays in any suitable direction. For example, a light beam emitted by a pixel on the object A on the display device (120) includes a bundle of light rays in suitable directions. A subset (124) of the light rays in the light beam can be directed by the optical system (110) to the area (151). An angular span of the subset (124) of the light beam can be determined based on an acceptance angle $\omega$ of the optical system (110). Three light rays (121)-(123) of the subset (124) of the light beam are shown in FIG. 5A. The three light rays (121)-(123) can include two boundary rays (121) and (123) and a center ray (122). In an embodiment, the light beams generated by the display device (120) can be circularly polarized or linearly polarized.

The optical system (110) can be configured to modify the light beams generated by the display device (120) or a real object, and direct the modified light beams to the area (151). The optical system (110) can be disposed between the display device (120) and the area (151). The second lens (132) can be disposed between the first lens (131) and the display device (120). In an example, the first lens (131) can be referred to as an eye lens according to a proximity to the area (151) (e.g., the eye (60)), and the second lens (132) can be referred to as a display lens according to a proximity to the display device (120).

Referring to FIG. 5A, the beam splitter (141) is disposed on the surface (137) of the second lens (132), and the reflective polarizer (139) is disposed on the surface (136) of the first lens (131). The optical cavity can be formed between the beam splitter (141) and the reflective polarizer (139). The quarter-wave plate (142) is formed on the surface (135) of the first lens (131).

According to an embodiment of the disclosure, the optical system (110) can include the vision correction adapter (401). The optical cavity can include the lens system (130), a distance or a gap (197) between the first lens (131) and the second lens (132), and the QWP (142). The distance or the gap (197) between the first lens (131) and the second lens (132) can refer to a distance (or a gap) between a vertex V1 (e.g., an intersection of the surface (135) and the optical axis (160)) of the first lens (131) and a vertex V2 (e.g., an intersection of the surface (138) and the optical axis (160)) of the second lens (132). The gap (197) between the first lens (131) and the second lens (132) can be determined by the vision correction adapter (401) (e.g., a thickness of the vision correction adapter (401)). A thickness T between the surfaces (402)-(403) of the vision correction adapter (401) can be identical to the gap (197) between the first lens (131) and the second lens (132).

The vision correction adapter (401) includes a circular band between two parallel surfaces. A center region of the vision correction adapter (401) can include an opening. Referring to FIG. 5A, the thickness T of the vision correction adapter (401) can be selected as a threshold thickness (e.g., a value T1) such that a bundle of rays from a pixel on the display device (120) (e.g., the rays (121)-(123)) can become collimated rays (or substantially collimated rays) between the optical system (110) and the area (151), and the vision correction adapter (401) does not correct for nearsightedness or farsightedness. The distance $D2_A$ can be infinity if the bundle of rays from the pixel on the display device (120) are collimated. In some examples, the distance $D2_A$ are relatively large, such as one or more meters (e.g., 2 m) if the bundle of rays from the pixel on the display device (120) are substantially collimated. If the eye (60) does not have nearsightedness and does not have farsightedness, an object (e.g., the object A) on the display device (120) can be imaged onto the retina (65) of the eye (60) without vision correction, and the eye (60) can see clearly the object A.

The light beams emitted from the display device (120) can be partially transmitted by the beam splitter (141). Subsequently, the light beams pass the optical cavity a plurality of times. In an example, the light beams pass the optical cavity for a first time and are reflected by the reflective polarizer (139). The light beams then pass the optical cavity for a second time and are partially reflected by the beam splitter (141). After passing the optical cavity for a third time, the light beams are transmitted by the reflective polarizer (139) and reach the area (151).

The optical system (110) includes a catadioptric optical system. For example, the catadioptric optical system (110) includes (i) refractive optical components (e.g., the lens system (130)) and (ii) reflective optical components (e.g., the beam splitter (141) when acting as a reflector to reflect light and the reflective polarizer (139) when acting as a reflector to reflect light).

The catadioptric optical system (110) may include a polarized catadioptric optical system. For example, each time the light beams pass through the QWP (142), a polarization state of the light beams is manipulated by the QWP (142). Accordingly, the light beams are in one polarization state and is reflected by the reflective polarizer (139) after the first pass, and the light beams are in another polarization state and is transmitted by the reflective polarizer (139) after passing the optical cavity for a third time.

The optical system (110) may be referred to as a folded optical system. As light beams are reflected between the beam splitter (141) and the reflective polarizer (139), and travel multiple times (e.g., three times) in the optical cavity, an optical path between the display device (120) and the area (151) includes a folded path (125) between the beam splitter (141) and the reflective polarizer (139). The folding of the optical path can allow the distance D1 to be decreased, and the display system (100) including the optical system (110) can be used as a NED system. In an example, the lens system (130) is designed to have a relatively small thickness D5, and may be referred to as a pancake lens system.

Referring to FIG. 5A, the ray (122) emitted from the display device (120) is partially transmitted by the beam splitter (141). Subsequently, the ray (122) passes the optical cavity for a first time where the ray (122) sequentially passes through the second lens (132), the gap (197), the QWP (142), and the first lens (131).

After the ray (122) passes the optical cavity for the first time, the ray (122) is reflected back into the optical cavity by the reflective polarizer (139). Subsequently, the ray (122) passes the optical cavity for a second time where the ray (122) sequentially passes through the first lens (131), the QWP (142), the gap (197), and the second lens (132).

After the ray (122) passes the optical cavity for the second time, the ray (122) is partially reflected back into the optical cavity by the beam splitter (141). Subsequently, the ray (122) passes the optical cavity for a third time where the ray (122) sequentially passes through the second lens (132), the gap (197), the QWP (142), and the first lens (131). Then, the ray (122) is transmitted by the reflective polarizer (139) and travels to the area (151). In an example, the ray (122) is focused by the lens (63) of the eye (60) onto the retina (65), and the eye (60) perceives the ray (122) as if the ray (122) is from a virtual point on the virtual image A".

The light beams emitted from the pixels in the display device (120) can be circularly polarized, for example, in a first circular polarization state. The beam splitter (141) partially transmits the ray (122) in the first circular polarization state. Then the ray (122) passes the optical cavity for the first time as described above. During the first pass, the first circular polarization state of the ray (122) is converted to the second linear polarization state by the QWP (142). The second linear polarization state is along a block direction of the reflective polarizer (139). The block direction of the reflective polarizer (139) refers to a direction where if an electric field vector of a light beam is along the block direction, the light beam is blocked by the reflective polarizer (139) and is not transmitted through the reflective polarizer (139). The reflective polarizer (139) reflects the ray (122) having the second linear polarization state, for example, with a relatively high average reflectance that is above or equal to a value (e.g., 90%) over a wavelength range (e.g., 380 to 780 nm). Then the ray (122) passes the optical cavity for the second time as described above, and the ray (122) is partially reflected by the beam splitter (141). Subsequently, the ray (122) passes the optical cavity for the third time as described above. During both the second pass and the third pass, the QWP (142) alters the polarization state of the ray (122). Accordingly, the second linear polarization state of the ray (122) is converted to the first linear polarization state that is parallel to a transmission direction of the reflective polarizer (139). Thus, the reflective polarizer (139) transmits the ray (122) having the first linear polarization state such that the ray (122) is directed to the area (151) with a relatively high transmittance that is above or equal to a value (e.g., 90%) over a wavelength range (e.g., 380 to 780 nm). Referring to FIG. 5A, the optical path includes the folded path (125) between the reflective polarizer (139) and the beam splitter (141) due to the polarization change.

As described above in FIG. 5A, when the thickness T of the vision correction adapter (401) has the threshold thickness or the value T1 (e.g., 2.44 mm or 2.566 mm), the vision correction adapter (401) positioned between the first lens (131) and the second lens (132) in the optical system (110) provides no vision correction to nearsightedness and no vision correction to farsightedness. Referring to FIG. 5A, the first lens (131) and the second lens (132) are spaced apart by the thickness T1 of the vision correction adapter. A relative optical diopter corresponding to FIG. 5A can be 0.

The display system (100) and the optical system (110) in FIG. 5B are described in FIG. 5A except the following difference. In an example, the eye (60) in FIG. 5B is nearsighted. According to an embodiment of the disclosure, the thickness T of the vision correction adapter (401) can be less than the threshold thickness or the value T1 to correct for the nearsightedness, such as shown in FIG. 5B. Referring to FIG. 5B, the thickness T of the vision correction adapter (401) in the optical system (110) is less than the value T1, and the optical system (110) can form a virtual image B" on an image plane (199B) in FIG. 5B based on the object A on the display device (120). A distance $D2_B$ (e.g., 100 mm) between the image plane (199B) and the area (151) can be less than the distance $D2_A$. The lens (63) in the eye (60) forms an image B' on the retina (65) of the eye (60) based on the virtual image B", and thus the eye (60) can see the object A on the display device (120) clearly with the vision correction provided by reducing the gap (197) between the first lens (131) and the second lens (132).

Referring to FIG. 5B, the thickness T (e.g., a value T2 such as 0.02 mm) of the vision correction adapter (401) is less than the threshold thickness (or the value T1) such that a bundle of rays from a pixel on the display device (120) (e.g., the rays (121)-(123)) can become diverging rays between the optical system (110) and the area (151), and the vision correction adapter (401) is configured to correct for nearsightedness. The lens system (130) with the gap (197) (e.g., equal to T2) between the first lens (131) and the second lens (132) being less than the threshold thickness can function as a diverging lens with a negative optical power (e.g., a negative relative diopter shown in FIG. 5D).

Referring to FIG. 5B, the first lens (131) and the second lens (132) are spaced apart by the thickness T2 of the vision correction adapter. A relative optical diopter corresponding to FIG. 5B can be less than 0. The distance $D2_B$ can be relatively small, for example, $D2_B$ is less than $D2_A$. Referring to FIG. 5B, the optical system (110) includes the vision correction adapter (401) with the thickness T2 to separate the first lens (131) and the second lens (132), and the optical system (110) can image an object (e.g., the object A) on the display device (120) onto the retina (65) of the eye (60) that is nearsighted, and the eye (60) can see clearly the object A.

According to an embodiment of the disclosure, the thickness T of the vision correction adapter (401) can be larger than the threshold thickness (or the value T1) to correct for the farsightedness, such as shown in FIG. 5C.

The display system (100) and the optical system (110) in FIG. 5C are described in FIG. 5A except the following difference. In an example, the eye (60) in FIG. 5C is farsighted. According to an embodiment of the disclosure, the thickness T of the vision correction adapter (401) can be larger than the threshold thickness (or the value T1) to correct for the farsightedness, such as shown in FIG. 5C. Referring to FIG. 5C, the thickness T of the vision correction adapter (401) in the optical system (110) is larger than the value T1, and the optical system (110) can form a virtual image C" on an image plane (199C) in FIG. 5C based on the object A on the display device (120). Comparing FIGS. 5B-5C, the image plane (199B) and the image plane (199C) can be on opposite sides of the area (151), and a sign of a distance $D2_C$ (e.g., −100 mm) between the image plane (199C) and the area (151) can be opposite to that of the distance $D2_B$. In an example, the distance $D2_B$ is positive, and the distance $D2_C$ is negative.

The lens (63) in the eye (60) forms an image C' on the retina (65) of the eye (60) based on the virtual image C", and thus the eye (60) can see the object A on the display device (120) clearly with the vision correction by increasing the gap (197) between the first lens (131) and the second lens (132).

Referring to FIG. 5C, the thickness T (e.g., a value T3 such as 5.08 mm) of the vision correction adapter (401) is larger than the threshold thickness (or the value T1) such that a bundle of rays from a pixel on the display device (120) (e.g., the rays (121)-(123)) can become converging rays between the optical system (110) and the area (151), and the vision correction adapter (401) is configured to correct for farsightedness. Referring to FIG. 5C, the first lens (131) and the second lens (132) are spaced apart by the thickness T3 of the vision correction adapter. The lens system (130) with the gap (197) (e.g., equal to T3) between the first lens (131) and the second lens (132) being larger than the threshold thickness can function as a converging lens with a positive optical power (e.g., a positive relative diopter shown in FIG. 5D). A relative optical diopter corresponding to FIG. 5C can be larger than 0 indicating that the optical system (110) in FIG. 5C is more converging than the optical system (110) in FIG. 5A. Referring to FIG. 5C, the optical system (110) includes the vision correction adapter (401) having the thickness T3 to separate the first lens (131) and the second lens (132), and the optical system (110) can image an object (e.g., the object A) on the display device (120) onto the retina (65) of the eye (60) that is farsighted, and the eye (60) can see clearly the object A.

FIG. 5D shows examples of vision correction to correct for nearsightedness and farsightedness. Columns from left to right indicate a relative diopter, a correction type (e.g., a nearsightedness correction or a farsightedness correction), a thickness of the vision correction adapter (401) (or the gap (197) between the vertex V1 of the first lens (131) and the vertex V2 of the second lens (132)), a resolution (e.g., a root mean square (RMS) size) of the display system (100) without the vision correction, and a resolution (e.g., a RMS size) of the display system (100) with the vision correction shown in FIGS. 5A-5C.

For a normal eyesight (indicated by a row (501)) that is without nearsightedness and without farsightedness, no vision correction is applied to the display system (100) as shown in FIG. 5A, the relative diopter is 0 corresponding to the thickness T1 (e.g., the gap of 2.44 mm). The resolution is 3.2 microns.

The resolution of the display system (100) without the vision correction can indicate a degree of nearsightedness or farsightedness. A degree (e.g., a value) of the relative diopter can depend on the resolution of the display system (100) without the vision correction. For example, the larger the RMS size without the vision correction, the larger an absolute relative diopter used to correct for nearsightedness or farsightedness. The thickness of the vision correction adapter (401) or the gap (197) can be determined based on the sign and the degree of the relative diopter.

For nearsightedness indicated by rows (502)-(505), the vision correction is applied to the display system (100) to correct for the nearsightedness, such as shown in FIG. 5B, the relative diopter is negative, such as from −7.5 to −0.5, the gaps are less than the threshold thickness (e.g., 2.44 mm), such as from 0.54 mm to 2.31 mm. The resolution of the display system (100) can be improved significantly by correcting the nearsightedness, for example, the resolution increases approximately 10 to 200 times with the nearsightedness correction indicated by the rows (502)-(505) (e.g., the RMS size without correction is approximately 10 to 200 times as large as a corresponding RMS size with correction).

For farsightedness indicated by rows (506)-(511), the vision correction is applied to the display system (100) to correct for the farsightedness, such as shown in FIG. 5C, the relative diopter is positive, such as from 0.49 to 8.5, the gaps are larger than the threshold thickness (e.g., 2.44 mm), such as from 2.56 mm to 4.58 mm. The resolution of the display system (100) can be improved significantly by correcting the farsightedness, for example, the resolution increases approximately 10 to 200 times with the farsightedness correction indicated by the rows (506)-(511) (e.g., the RMS size without correction is approximately 10 to 117 times as large as a corresponding RMS size with correction).

As indicated by FIG. 5D, varying the thickness T of the vision correction adapter (401) can control the separation or the gap (197) of the first lens (131) and the second lens (132), and thus can correct for the nearsightedness or the farsightedness.

Figure 4C:
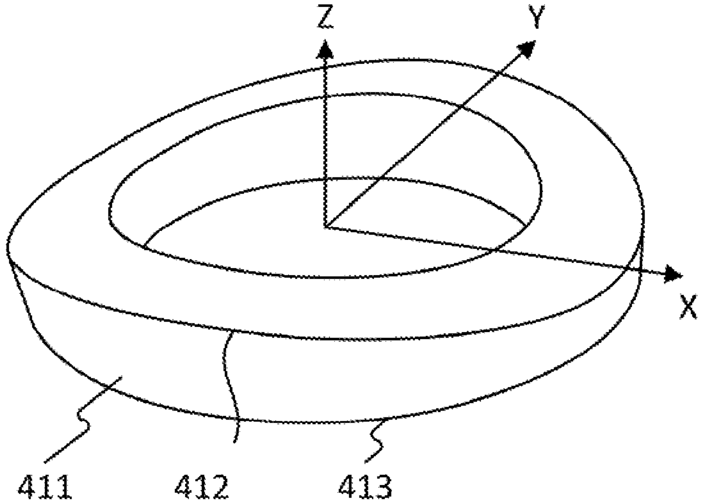
Figure 4D:
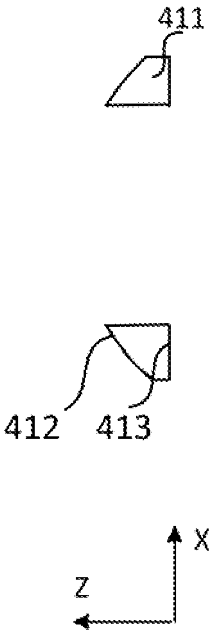

FIGS. 4C-4D show an example of a vision correction adapter (411) used to correct for astigmatism according to an embodiment of the disclosure. FIG. 4D shows a side view of the vision correction adapter (411) in the XZ plane.

Astigmatism can occur, for example, when a cornea or a lens of an eye is irregularly shaped. Astigmatism can cause an image to appear blurry or distorted because light is not focused properly on a retina of the eye. When an eye is evenly rounded (e.g., with a ball shape), no astigmatism occurs. When the eye has an irregular shape (e.g., oval-shaped), astigmatism can occur. In an example, astigmatism is caused by a cornea and/or a lens in the eye that have irregular shape(s) (e.g., oval-shaped). For example, horizontal astigmatism can occur when a width of the eye is larger than a height of the eye, and vertical astigmatism can occur when the width of the eye is less than the height of the eye. With astigmatism, vision can be blurry.

Astigmatism of an eye can be indicated by a degree of the astigmatism and an orientation of the astigmatism. A relative diopter (e.g., a parameter cylindrical power or Cylinder (CYL)) can measure in diopters the degree of the astigmatism of the eye and can be a negative or a positive number. A bigger Cylinder (CYL) can indicate more astigmatism. A parameter Axis can be a number between 0° and 180° that can indicate the orientation of the astigmatism.

A cylindrical lens can be used to correct astigmatism. A prescription for the cylindrical lens can specify the optical power or the cylindrical power (e.g., using the parameter Cylinder (CYL)) of the cylindrical lens, as well as the axis (e.g., using the parameter Axis) at which the cylindrical lens is to be placed. In an example, a cylindrical lens has an optical power in a first axis and has no optical power in a second axis that is perpendicular to the first axis.

In some examples, surface(s) of a lens (e.g., a spherical lens having an identical optical power in the first axis and in the second axis) can be flexed or bent such that a surface of the lens can have differing shapes and thus the lens can have different optical powers in two different axes (e.g., the first axis and the second axis) to correct for astigmatism.

Referring to FIGS. 4C-4D, a shape of the vision correction adapter (411) (e.g., a cylindrical spacer adapter) can be based on the astigmatism (e.g., a degree of astigmatism and an orientation of the astigmatism), and the vision correction adapter (411) can be configured to alter shape(s) of one or more lenses (e.g., the first lens (131)) in the optical system (110) to conform to the shape of the vision correction adapter (411) to correct for the astigmatism.

The vision correction adapter (411) can include a circular band between surfaces (412)-(413). A center region of the vision correction adapter (411) can include an opening. At least one of the surfaces (412)-(413) is curved. In the example shown in FIGS. 4C, 4D, and 6A, the surface (412) is a curved surface (412). A shape of the curved surface (412) can be based on the degree of the astigmatism and the orientation (e.g., X axis, Y axis, or the like) of the astigmatism. The vision correction adapter (411) can be positioned against a lens (e.g., (131)) such that the lens is flexed based on the shape of the vision correction adapter (411). A surface of the lens can have different shapes in two different axes (e.g., the first axis and the second axis) and thus the lens can have different optical powers in the two different axes (e.g., the first axis and the second axis) to correct for astigmatism.

Figure 6A:
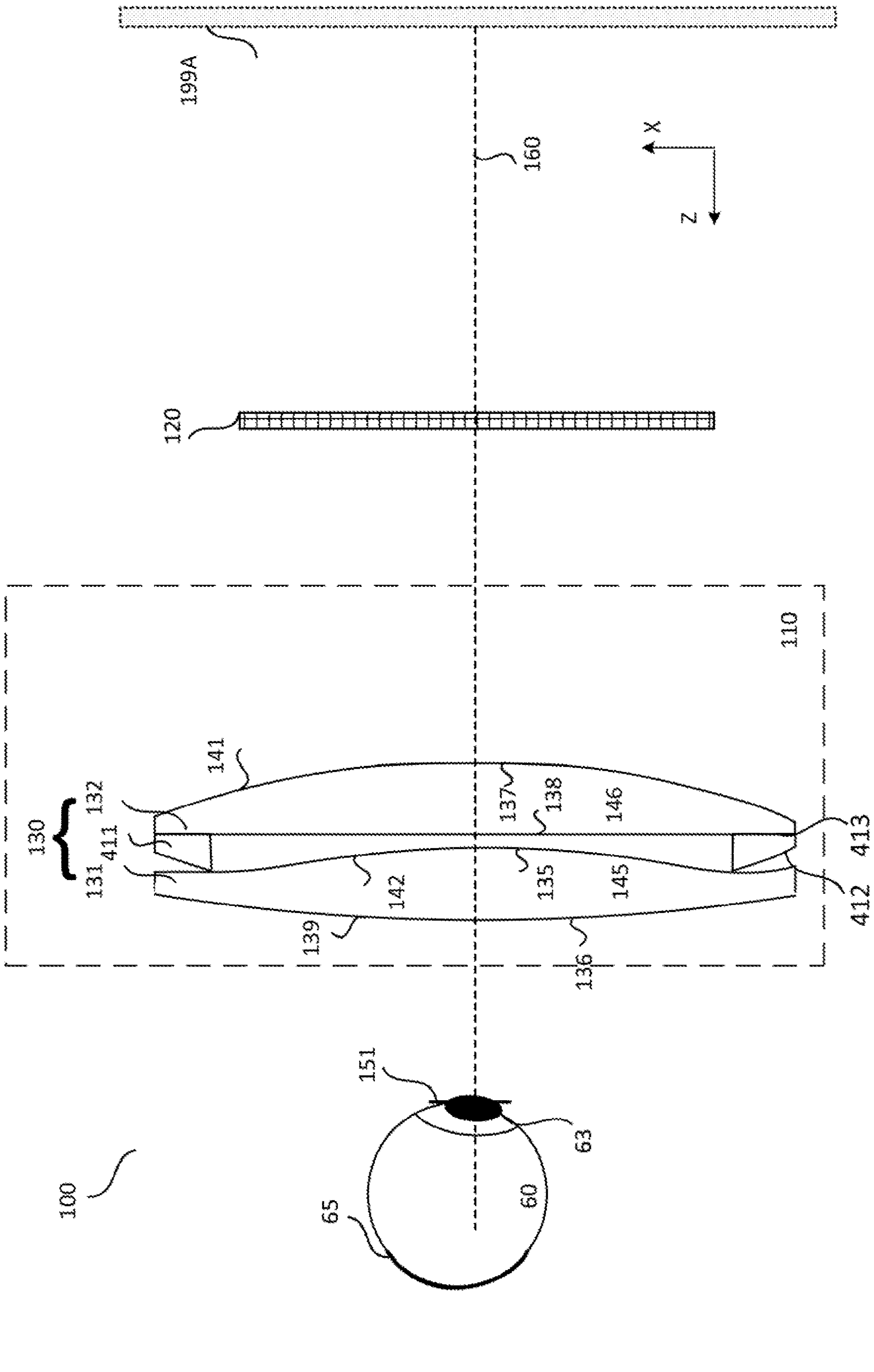
FIG. 6A shows an example of vision correction to correct for astigmatism.

FIG. 6A shows an example of vision correction to correct for astigmatism. Referring to FIG. 6A, the display system (100) includes the optical system (110). Components of the optical system (110) and the display system (100) are described in FIG. 5A except the following difference. The optical system (110) in FIG. 6A includes the vision correction adapter (411). Referring to FIGS. 4C, 4D, and 6A, the curved surface (412) of the vision correction adapter (411) can be configured to alter the shape of the first lens (131) to conform to the curved surface (412). The first lens can be flexible. The shape of the first lens can be controlled or manipulated accurately based on the shape of the vision correction adapter (411), such as the curved surface (412) of the vision correction adapter (411). In an example, the vision correction adapter (411) is positioned against the first lens (131) (e.g., a peripheral region of the first lens (131)) such that the first lens (131) is flexed based on the shape of the vision correction adapter (411). When the first lens (131) is flexed, the shape of the first lens (131) can conform completely or substantially to the shape of the curved surface (412) of the vision correction adapter (411). In an example, the first lens (131) is attached to the vision correction adapter (411) with an appropriate radius and an axis orientation to correct for astigmatism.

Referring to FIG. 6A, in the XZ plane, shapes of the surfaces (135)-(136) are changed (e.g., different from the shapes of the surfaces (135)-(136) in FIGS. 5A-5C) based on the shape of the curved surface (412). In the YZ plane, shapes of the surfaces (135)-(136) remain unchanged (e.g., identical to the shapes of the surfaces (135)-(136) in FIGS. 5A-5C). The vision correction adapter (411) can change a first optical power along a first axis (e.g., the X axis) of the first lens (131) and a second optical power along a second axis (e.g., the Y axis) of the first lens (131) differently, and thus correct for astigmatism. For example, based on the orientation of the astigmatism, the shape of the curved surface (412) is determined such that the shape of the curved surface (412) varies along the X axis, and remains unchanged along the Y axis, and thus the vision correction adapter (411) changes the first optical power along the X axis of the first lens (131) and does not change the second optical power along the Y axis of the first lens (131).

The vision correction adapter (411) can be positioned in any suitable position in the optical system (110), such as adjacent to the one or more lenses whose shapes the vision correction adapter (411) can change. In the example shown in FIG. 6A, the vision correction adapter (411) is positioned between the first lens (131) and the second lens (132), and the vision correction adapter (411) is configured to change the shape of the first lens (131) and does not change the shape of the second lens (132). In some examples, the vision correction adapter (411) is configured to change the shapes of the first lens (131) and the second lens (132). In some examples, the vision correction adapter (411) is positioned outside the lens system (130), for example, to the left of the first lens (131) and is configured to change the shapes of the first lens (131).

FIG. 6B shows examples to correct for astigmatism. Columns from left to right indicate a relative diopter (e.g., a cylindrical power along a single axis), a cylindrical sagitta (or sag) (in millimeters (mm)), a radius of curvature of the curved surface (412) of the vision correction adapter (411), a resolution (e.g., an RMS size) of the display system (100) with astigmatism and without the vision correction, and a resolution (e.g., an RMS size) of the display system (100) with the astigmatism corrected, such as shown in FIG. 6A. The relative diopter can indicate a cylindrical power of a cylindrical lens having an identical shape (e.g., an identical radius of curvature) as that of the vision correction adapter (411). The cylindrical sagitta can indicate a displacement along an optical axis (e.g., (160)) from a vertex of a cylindrical surface (e.g., (412)). In an example, the relative diopter, the cylindrical sagitta (or sag), and the radius of curvature of the curved surface (412) of the vision correction adapter (411) are shown for a single axis (e.g., the X axis), and a relative diopter, a cylindrical sagitta (or sag), and a radius of curvature of the curved surface (412) of the vision correction adapter (411) for the Y axis are 0, 0 mm, and infinite, respectively. In an example, the curved surface (412) is flat when the radius of curvature is infinite.

The resolution of the display system (100) without the vision correction can indicate a degree of astigmatism. A degree (e.g., a value) of the relative diopter can depend on the resolution of the display system (100) without the vision correction. For example, the larger the RMS size without the vision correction, the larger an absolute relative diopter used to correct for astigmatism. The radius of curvature (and the cylindrical sag) of the curved surface (412) of the vision correction adapter (411) can be determined based on the sign and the degree of the astigmatism.

For a normal eyesight (indicated by a row (601)) that is without astigmatism, no correction to astigmatism is applied to the display system (100), such as shown in FIG. 5A, the relative diopter is 0, the cylindrical sagitta is 0 mm, and the radius of curvature of the curved surface (412) of the vision correction adapter (411) is infinite. The resolution is 2.2 microns.

The relative diopters can be negative (e.g., indicated by rows (602)-(603)) or positive (e.g., indicated by rows (602)-(603)) to correct for the astigmatism. The resolution of the display system (100) can be improved significantly by correcting the astigmatism, for example, the resolution increases approximately 10 to 30 times with the astigmatism correction indicated by the rows (602)-(606) (e.g., the RMS size without correction is approximately 10 to 30 times as large as a corresponding RMS size with correction).

As described in FIG. 3G, a prism can be used to shift a first image formed by an optical system in a first eye of a viewer, and thus the first image and a second image formed in a second eye can form a single image perceived by the viewer. In an example, a lens having an optical power is tilted such that the lens functions as (i) a lens with the same or similar optical power of the lens before being tilted and (ii) a prism that is configured to shift an image, as shown in FIGS. 7A-7B.

Figure 7A:
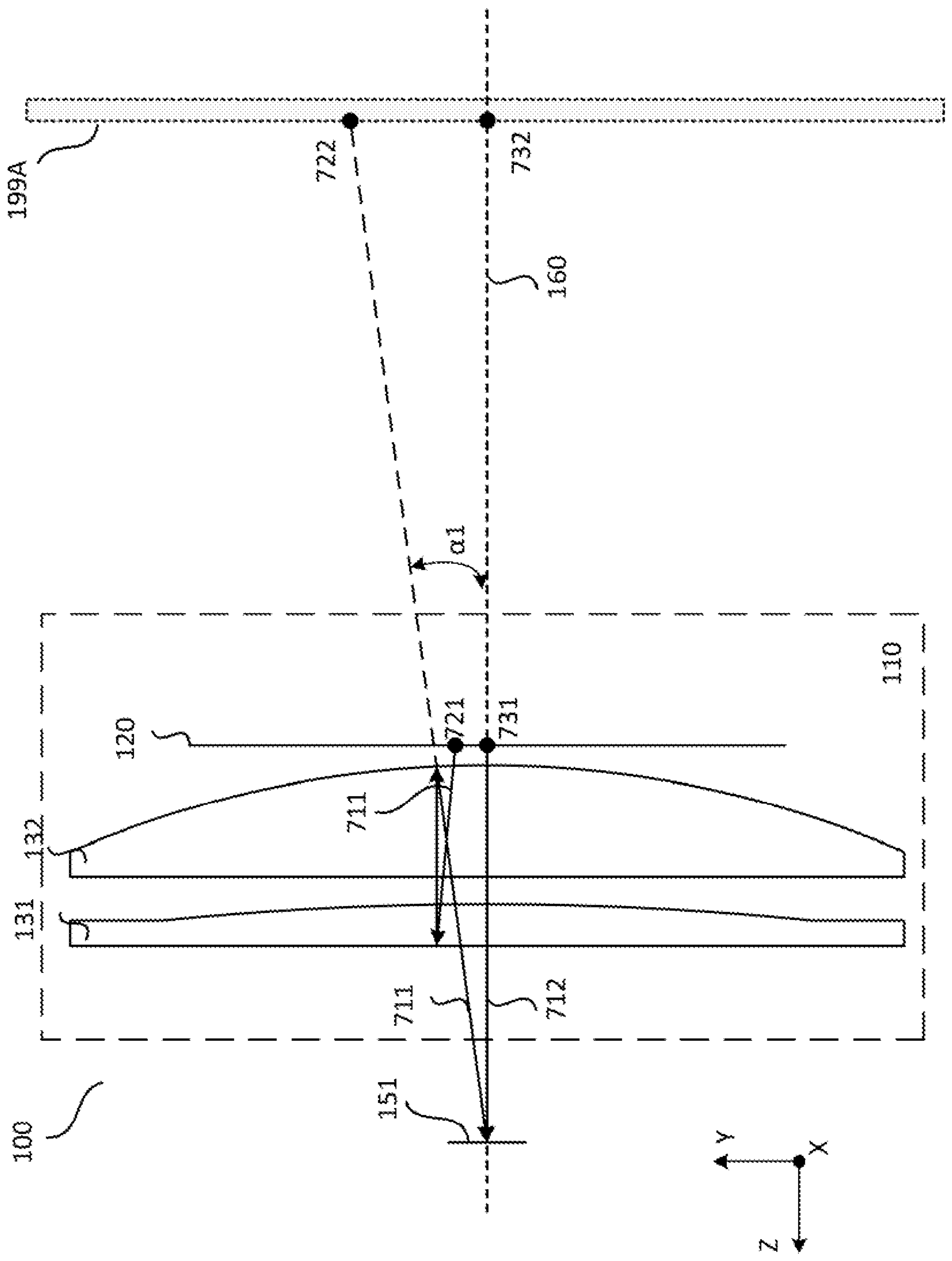
FIGS. 7A-7B show examples of a portion of a display system without double vision correction (FIG. 7A) and with double vision correction (FIG. 7B).
Figure 7B:
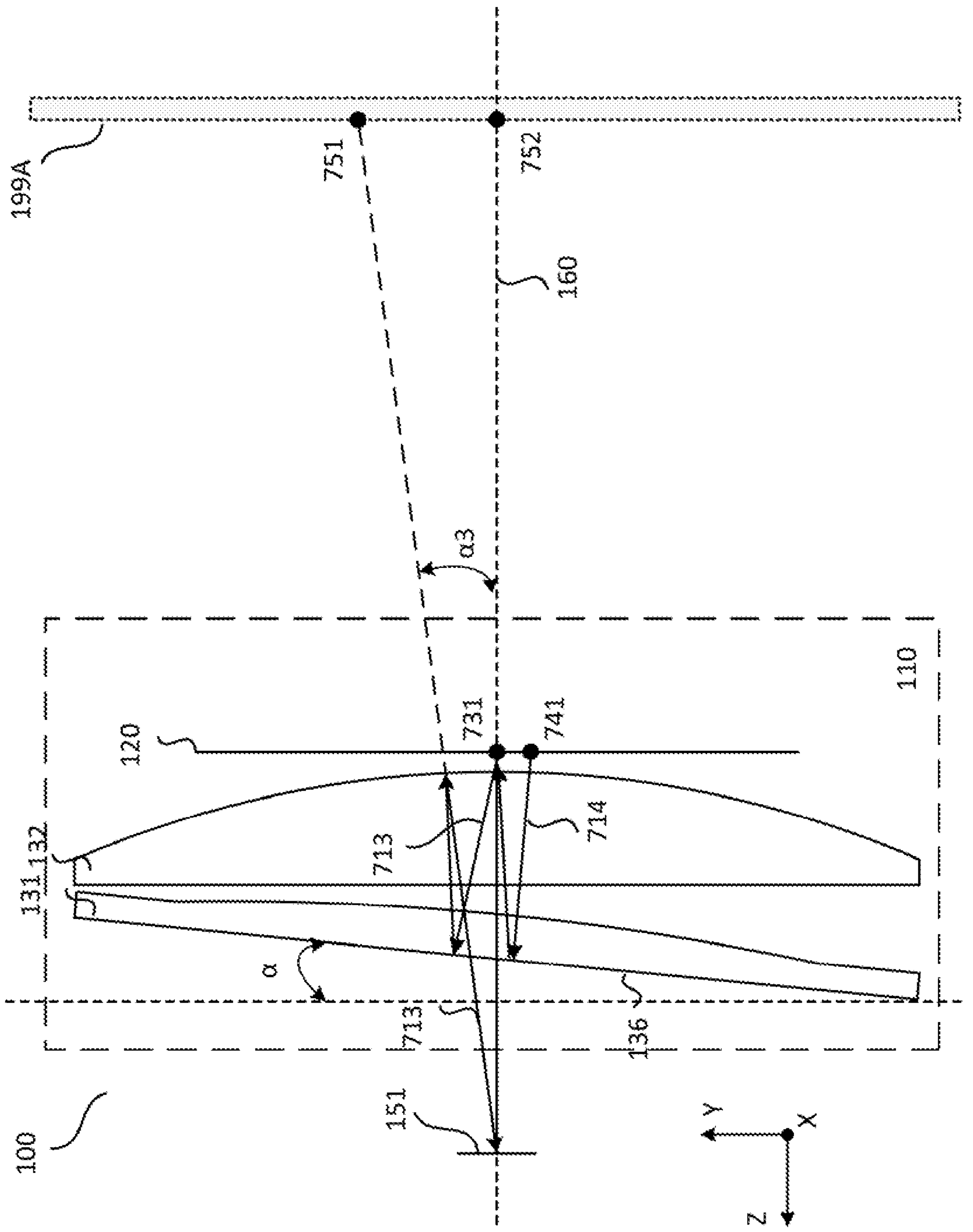

FIGS. 7A-7B show examples of a portion of the display system (100) without double vision correction (FIG. 7A) and with double vision correction (FIG. 7B). The display system (100) in FIGS. 7A-7B may or may not include the vision correction adapter (401).

The display system (100) in FIG. 7A can be identical or similar to the display system (100) in FIG. 5A and components associated with the display system (100) are described in FIG. 5A. In an example, the display system (100) in FIG. 7A does not include the vision correction adapter (401). In an example, a pixel (721) (e.g., located at 2 mm above a center position of the display device (120)) on the display device (120) emits a bundle of rays including a ray (711). The ray (711) can be directed to the area (151) at a field angle $\alpha 1$ (e.g., 5.3°), and a virtual image (722) is formed on the image plane (199A). A pixel (731) (e.g., located at the center position of the display device (120)) on the display device (120) emits a bundle of rays including a ray (712). The ray (712) can be directed to the area (151) at a field angle $\alpha 2$ (e.g., 0°), and a virtual image (732) is formed on the image plane (199A).

In an example, the display system (100) in FIG. 7B does not include the vision correction adapter (401). The display system (100) in FIG. 7B can be identical to the display system (100) in FIG. 7A except that one of the lenses is tilted. Components associated with the display system (100) in FIG. 7B are described in FIG. 5A. Referring to FIG. 7B, the first lens (131) is tilted with a tile angle $\alpha$ (e.g., 5°) between the surface (136) of the first lens (131) and the Y axis. In an example, the pixel (731) (e.g., located at the center position of the display device (120)) on the display device (120) emits a bundle of rays including a ray (713). The ray (713) can be directed to the area (151) at a field angle $\alpha 3$ (e.g., 5.3°), and a virtual image (751) is formed on the image plane (199A). A pixel (741) (e.g., located at 2 mm below the center position of the display device (120)) on the display device (120) emits a bundle of rays including a ray (714). The ray (714) can be directed to the area (151) at a field angle $\alpha 4$ (e.g., 0°), and a virtual image (752) is formed on the image plane (199A).

Referring to FIGS. 7A-7B, when the first lens (131) is tilted, an image (e.g., the virtual image of the pixel (731)) is shifted, for example, upward from the virtual image (732) in FIG. 7A (without lens tilting) to the virtual image (752) in FIG. 7B (with lens tilting). A tilt of a lens in the optical system (110) can allow an image shift such that a binocular double vision can be fused into a single vision (e.g., one image perceived by the viewer), and thus correcting for the binocular double vision.

Figure 8A:
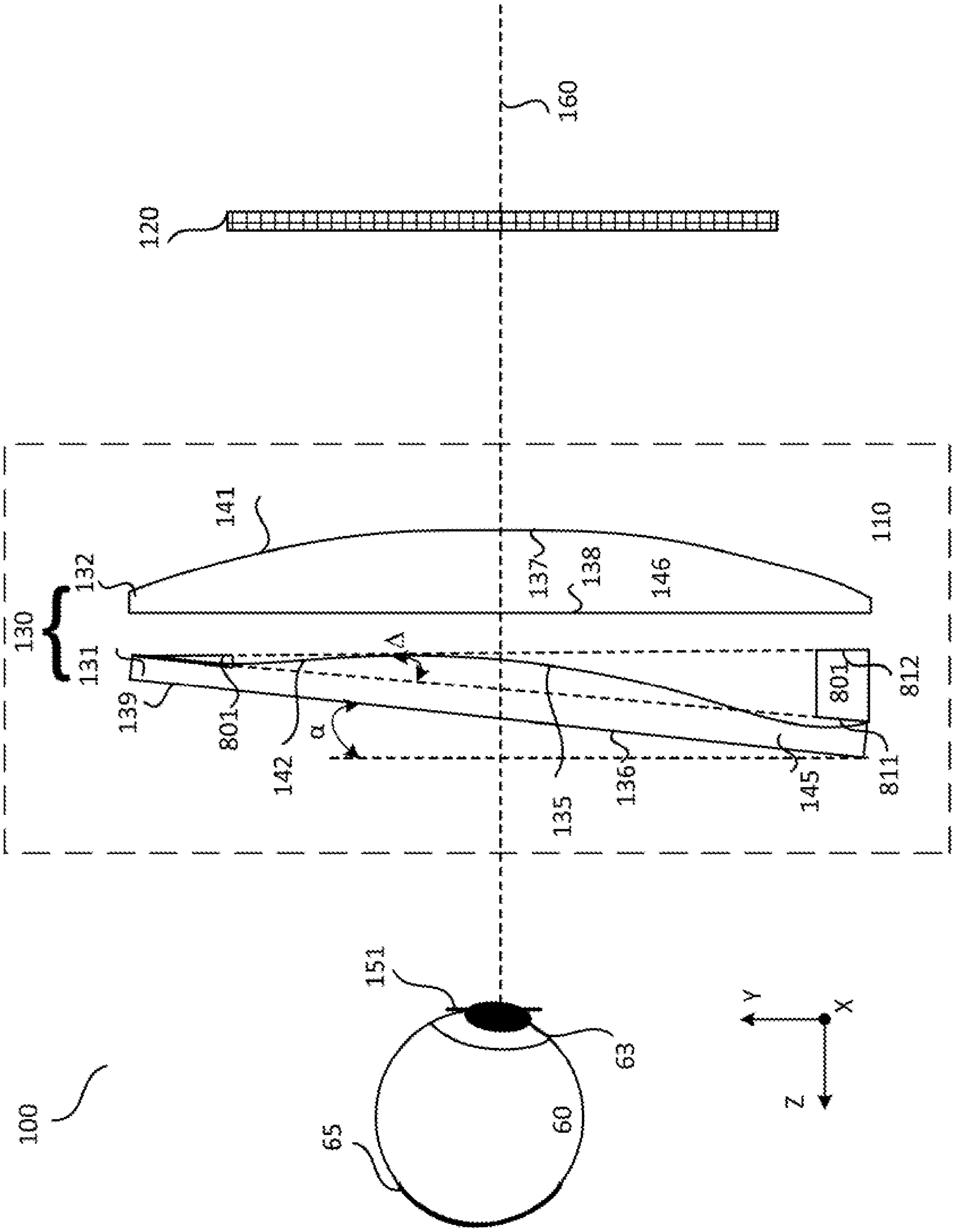
FIG. 8A shows an example of double vision correction in a display system.

According to an embodiment of the disclosure, a lens (e.g., the first lens (131)) can be attached to a vision correction adapter (e.g., a prism) to correct for double vision (e.g., binocular double vision), as shown in FIG. 8A. FIG. 8A shows an example of double vision correction in the display system (100). The display system (100) in FIG. 8A can be identical or similar to the display system (100) in FIG. 7B. Components associated with the display system (100) in FIG. 8A are described in FIGS. 5A and 7B. The optical system (110) the display system (100) in FIG. 8A can include a vision correction adapter (e.g., a prism) (801) with a prism angle Δ between surfaces (811)-(812). In an example, a center region (marked in dashed lines in FIG. 8A) of the prism (801) includes an opening. A tilt angle and an orientation of the prism (801) can be based on a degree and an orientation of double vision, respectively. The tilt angle α of the prism (801) can be defined as an angle between a surface of the prism (801) and an axis (e.g., the optical axis (160), the Y axis, the X axis, or the like). In an example shown in FIG. 8A, the surface (812) is perpendicular to the optical axis (160) (e.g., parallel to the Y axis), and the surface (811) is tilted with respect to the surface (812) by the prism angle Δ (e.g., the surface (811) is tilted with respect to the optical axis (160) by 90°-Δ). Referring to FIG. 8A, the tilt angle α with respect to the Y axis is equal to Δ.

The prism (801) can be configured to tilt the first lens (131) according to the tilt angle α and the orientation (e.g., BO, BI, BU, BD, or the like) of the prism (801) to correct for the double vision. The prism (801) can be positioned against the first lens (131) (e.g., a peripheral region of the first lens (131)) such that the first lens (131) is tilted based on the tilt angle α and the orientation of the prism (801). The prism (801) can be positioned at any suitable position (e.g., to the left or to the right of the first lens (131)) in the optical system (110).

FIG. 8B shows examples to correct for double vision. Columns from left to right indicate a tilt angle (e.g., the tilt angle α in FIGS. 7B and 8A), a prism diopter, a field angle (e.g., α3 in FIGS. 7B), and a resolution (e.g., an RMS size) of the display system (100) with the double vision corrected, such as shown in FIGS. 7B and 8A. The field angle in FIG. 8B can correspond to a field angle (e.g., α3 in FIG. 7B) of a virtual image (e.g., (751)) of a pixel (e.g., (731)) at the center position of the display device (120). The field angle can depend on the tilt angle (or the prism diopter). As the tilt angle increases, the RMS size with the double vision correction may increase slightly and may reduce a resolution of the display system (100) slightly. As a degree of double vision increases, the tilt angle may be increased.

Vision defects such as nearsightedness/farsightedness, astigmatism, and double vision can be corrected for individually, such as shown in FIGS. 5A-5D, 6A-6B, and 8A-8B by positioning a vision correction adapter (e.g., (401), (411), or (801)) in the optical system (110). In some embodiments, multiple vision defects such as a plurality of nearsightedness/farsightedness, astigmatism, and double vision can be corrected for based on a single vision correction adapter.

In an example, nearsightedness/farsightedness and astigmatism is corrected for by a vision correction adapter. A shape of the vision correction adapter is determined based on astigmatism (e.g., as described in FIGS. 4C-4D, 6A-6B) and a thickness of the vision correction adapter is determined based on nearsightedness/farsightedness (e.g., as described in FIGS. 4A-4B, 5A-5D). The vision correction adapter can be positioned between the first lens (131) and the second lens (132) such that the gap (197) between the first lens (131) and the second lens (132) is based on the thickness T of the vision correction adapter, and shape(s) of the first lens (131) and the second lens (132) are modified based on the shape of the vision correction adapter.

In an example, nearsightedness/farsightedness and double vision is corrected for by a vision correction adapter. A shape of the vision correction adapter (e.g., a prism with a certain prism angle) is determined based on double vision (e.g., as described in FIGS. 3G and 8A-8B) and the thickness T of the vision correction adapter is determined based on nearsightedness/farsightedness (e.g., as described in FIGS. 4A-4B, 5A-5D). The vision correction adapter can be positioned between the first lens (131) and the second lens (132) such that the gap (197) between the first lens (131) and the second lens (132) is based on the thickness T of the vision correction adapter, and one of the first lens (131) and the second lens (132) is tilted based on the tilt angle of the vision correction adapter. In an example, a tilted surface of the vision correction adapter is tilted with respect to an axis (e.g., Y axis or the optical axis (160) of the optical system (110)). A tilt angle and an orientation of the tilted surface of the vision correction adapter can be based on double vision. The vision correction adapter can be configured to tilt the first lens (131) according to the tilt angle and the orientation of the tilted surface of the vision correction adapter to correct for the double vision.

In an example, astigmatism and double vision is corrected for by a vision correction adapter. A shape of the vision correction adapter is determined based on astigmatism and double vision. The vision correction adapter can be positioned between the first lens (131) and the second lens (132) such that one of the first lens (131) and the second lens (132) is tilted based on the tilt angle of the vision correction adapter, as described above. Further, one of the first lens (131) and the second lens (132) is flexed, such as described in FIG. 6A to correct for astigmatism. In an example, a single lens is both tilted and flexed by the vision correction adapter to correct for astigmatism and double vision. In an example, one of the first lens (131) and the second lens (132) is tilted by the vision correction adapter to correct for double vision and another one of the first lens (131) and the second lens (132) is flexed by the vision correction adapter to correct for astigmatism.

Figure 4E:
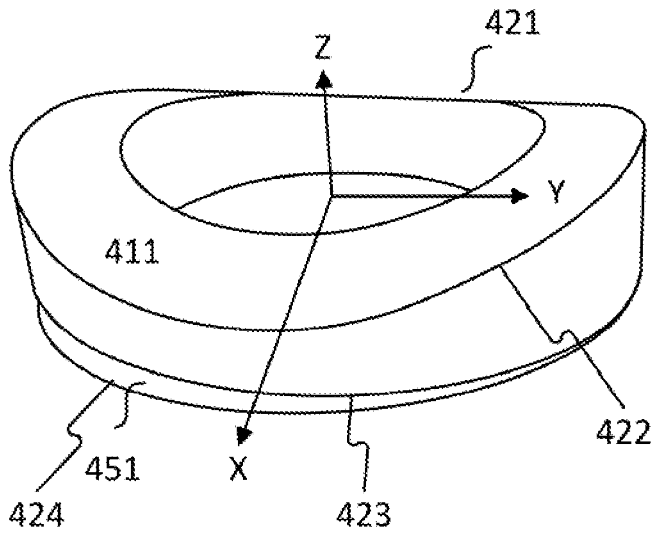
Figure 4F:
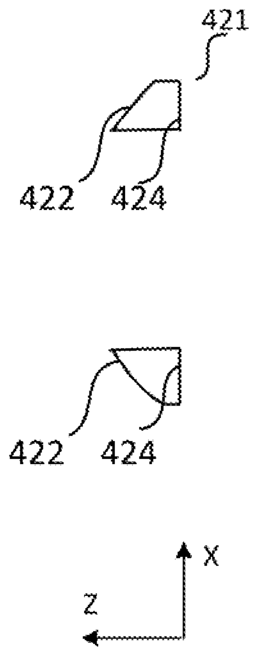
Figure 4G:
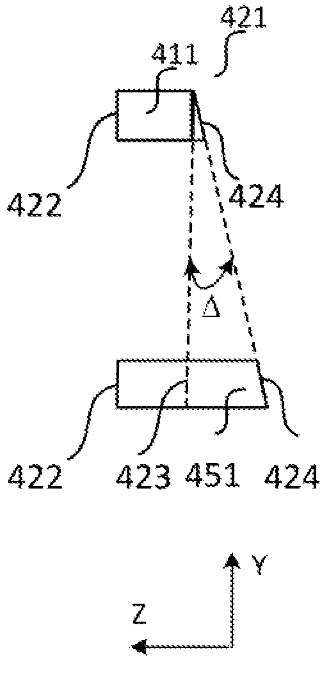

FIGS. 4E-4G show an example of a vision correction adapter (421) used to correct for astigmatism and double vision according to an embodiment of the disclosure. FIG. 4F shows a side view of the vision correction adapter (421) in the XZ plane. FIG. 4G shows a side view of the vision correction adapter (421) in the YZ plane.

Referring to FIGS. 4E-4G, a shape of the vision correction adapter (421) can be based on the astigmatism (e.g., a degree of astigmatism and an orientation of the astigmatism) and double vision, and the vision correction adapter (421) can be configured to alter shape(s) of one or more lenses (e.g., the first lens (131) and the second lens (132)) in the optical system (110) to conform to the shape of the vision correction adapter (421) to correct for the astigmatism and double vision.

The vision correction adapter (421) can include a circular band between surfaces (422) and (424). A center region of the vision correction adapter (421) can include an opening. At least one of the surfaces (422) and (424) is curved. In the example shown in FIGS. 4E-4G, the surface (422) is a curved surface (422), identical or similar to the curved surface (412) described in FIGS. 4C, 4D, and 6A. A shape of the curved surface (422) can be based on the degree of the astigmatism and the orientation of the astigmatism. The vision correction adapter (421) can be positioned against a lens (e.g., (131)) such that the lens is flexed based on the shape of the vision correction adapter (421) (e.g., the shape of the curved surface (422)). When the lens is flexed, a surface of the lens can have differing shapes in two different axes (e.g., X axis and Y axis) and thus the lens can have different optical powers in two different axes (e.g., X axis and Y axis) to correct for astigmatism. Referring to FIGS. 4F-4G, the surface (422) is a cylindrical surface that is curved in the XZ plane and is flat in the YZ plane.

The curved surface (422) of the vision correction adapter (421) can be configured to alter the shape of the first lens (131) to conform to the curved surface (422), such as described above. In an example, the vision correction adapter (421) is positioned against the first lens (131) (e.g., a peripheral region of the first lens (131)) such that the first lens (131) is flexed based on the curved surface (422) of the vision correction adapter (421). In an example, the first lens (131) is attached to the vision correction adapter (421).

In an example, in the XZ plane, shapes of the surfaces (135)-(136) are changed (e.g., different from the shapes of the surfaces (135)-(136) in FIGS. 5A-5C) based on the shape of the curved surface (422). In the YZ plane, shapes of the surfaces (135)-(136) remain unchanged (e.g., identical to the shapes of the surfaces (135)-(136) in FIGS. 5A-5C). The vision correction adapter (421) can change a first optical power along a first axis (e.g., the X axis) of the first lens (131) and a second optical power along a second axis (e.g., the Y axis) of the first lens (131) differently, and thus correct for astigmatism. For example, referring to FIGS. 4F-4G, the shape of the curved surface (422) varies along the X axis, and remains unchanged along the Y axis, and thus the vision correction adapter (421) changes the first optical power along the X axis of the first lens (131) and does not change the second optical power along the Y axis of the first lens (131).

Referring to FIGS. 4F-4G, the surface (424) can be tilted with a tilt angle Δ (e.g., with respect to the Y axis), and the surface (424) of the vision correction adapter (421) can be positioned against the second lens (132), similar to that is described in FIG. 8A, to tilt the second lens (132) with the tilt angle Δ to correct for double vision.

The vision correction adapter (421) can be positioned in any suitable position in the optical system (110), such as adjacent to one or more lenses whose shapes the vision correction adapter (421) can change. In the example, the vision correction adapter (421) is positioned between the first lens (131) and the second lens (132), and the vision correction adapter (421) is configured to change the shape of the first lens (131) based on the shape of the surface (422) and tilt the second lens (132) based on the shape of the surface (424).

Referring to FIGS. 4E-4G, in an example, the vision correction adapter (421) includes the vision correction adapter (411) configured to correct for the astigmatism and a prism (451) configured to correct for the double vision. The descriptions to the prisms (80) and (801) can be suitably applied to the prism (451). The vision correction adapter (411) and the prism (451) can be attached at an interface (423).

Figure 4H:
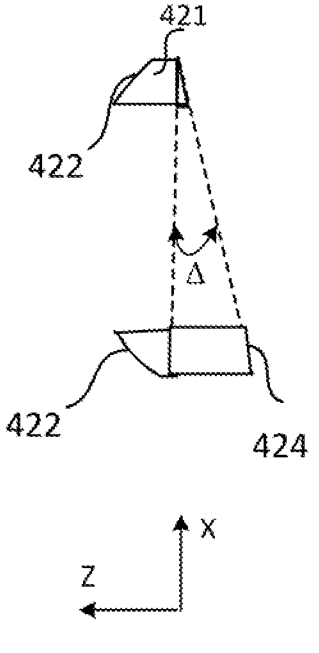

FIG. 4H show an example of the vision correction adapter (421) used to correct for astigmatism and double vision according to an embodiment of the disclosure. FIG. 4H shows a side view of the vision correction adapter (421) in the XZ plane. The description in FIGS. 4E-4G can be suitably adapted to the vision correction adapter (421) in FIG. 4H. The surface (422) in FIG. 4H can be identical to the surface (422) described in FIGS. 4E-4G. The surface (424) in FIG. 4H is different from the surface (424) in FIGS. 4E-4G as follows. The surface (424) in FIG. 4H can be tilted with the tilt angle Δ with respect to the X axis, and the surface (424) of the vision correction adapter (421) in FIG. 4H can be positioned against a lens, similar to that is described in FIG. 8A, to tilt the lens and correct for double vision.

The vision defects including nearsightedness/farsightedness, astigmatism, and double vision can be corrected for using a single vision correction adapter. For example, a thickness of the vision correction adapter (421) that is configured to correct for astigmatism and double vision is selected to correct for nearsightedness or farsightedness, the vision correction adapter (421) is positioned between the first lens (131) and the second lens (132), and the first lens (131) and the second lens (132) are spaced apart by the thickness of the vision correction adapter (421). Thus, the vision correction adapter (421) can correct for nearsightedness/farsightedness, astigmatism, and double vision.

In some examples, multiple vision correction adapters are used in the optical system (110) to correct for nearsightedness/farsightedness, astigmatism, and/or double vision. A first vision correction adapter can correct for one or more of nearsightedness/farsightedness, astigmatism, and double vision, and a second vision correction adapter can correct for another one of nearsightedness/farsightedness, astigmatism, and double vision that is different from the one or more of nearsightedness/farsightedness, astigmatism, and double vision. In an example, the first vision correction adapter is configured to correct for nearsightedness/farsightedness, and the second vision correction adapter can correct for astigmatism and/or double vision. The multiple vision correction adapters can be positioned in any suitable positions in the optical system (110). In an example, the first vision correction adapter is positioned between the first lens (131) and the second lens (132) to correct for nearsightedness/farsightedness, and the second vision correction adapter is positioned outside the lens system (130), such as to the left of the first lens (131) to flex or tilt the first lens (131) or to the right of the second lens (132) to flex or tilt the second lens (132) to correct for astigmatism and/or double vision.

The vision correction adapter can be used to correct for vision defect(s) of a viewer of an optical system including at least one lens, such as one lens, two lenses (e.g., shown in the optical system (110) in the disclosure), or more than two lenses. One or more surfaces of the vision correction adapter can be tilted to correct for double vision. One or more surfaces of the vision correction adapter can be curved to correct for astigmatism. A surface of the vision correction adapter can be shaped based on astigmatism and/or double vision. A curved and/or tilted surface of the vision correction adapter can be positioned against a surface of a lens in the optical system to flex the surface of the lens and/or tilt the lens. The vision correction adapter can be positioned against one lens to flex and/or tilt the lens. The vision correction adapter can be positioned against two lenses (e.g., (131) and (132) to (i) flex and/or tilt the first lens (131) and (ii) flex and/or tilt the second lens (132).

A lens in the optical system (110) can be flexed or tilted by the vision correction adapter that is controlled by the controller (180). Any suitable positional control and/or orientational control (or angular control) (e.g., mechanically, electrically, and/or the like) can be applied by the controller (180) and the shift block (170) to control a position and an orientation of the vision correction adapter with relatively high accuracy, such as on an order of 1 micron or 10 microns. Further, the lens being controlled can be made flexible and durable. Thus, a shape and/or a tilt angle of the lens can conform completely or substantially to the shape of the vision correction adapter. Thus, in various embodiments, vision defects can be corrected for more accurately by using the vision correction adapter in the optical system (110) than without the vision correction adapter.

As described in the disclosure, the center region of the vision correction adapter (e.g., (401), (411), (421), or (801)) to correct for the vision defect(s) can include an opening. Thus, light beams passing through the opening (or the center region) of the vision correction adapter are not obstructed or affected by the vision correction adapter in the optical system (110). In an example, a size of the opening of the vision correction adapter is selected such that light beams within the acceptance angle ω of the optical system (110) (e.g., the subset (124) of the light beam) can pass the opening of the vision correction adapter without being affected by the circular band of the vision correction adapter.

Referring to FIGS. 4A, 4C, 4E, and 8A, the vision correction adapter (e.g., (401), (411), (421), or (801)) includes a band. In some examples, the vision correction adapter is a circular band or a non-circular band. The band can have any suitable shape. The band can be an enclosed structure, such as shown in FIGS. 4A, 4C, and 4E. The band can be an unenclosed structure, such as a C-shaped structure, for example, due to noise truncation. The vision correction adapter does not necessarily have a smooth or a continuous contact surface. In an example, the vision correction adapter includes contact points that are sufficient to provide a spacing between two lenses, to tilt a lens (e.g., the first lens (131) or the second lens (132)), and/or to flex (or bend) a lens (e.g., the first lens (131) or the second lens (132)). In an example, the vision correction adapter includes discrete points or discrete point contacts that are in contact with a surface of a lens to tilt and/or flex the lens to correct for astigmatism and/or double vision. In an example, the vision correction adapter includes discrete point contacts that are in contact with a surface of a lens or surfaces of respective lenses to control a distance between the lenses to correct for nearsightedness/farsightedness.

In an embodiment, the vision correction adapter includes discrete point contacts positioned on a curved surface. A shape of the curved surface can be based on astigmatism (e.g., a degree of the astigmatism and an orientation of the astigmatism), and the discrete point contacts positioned on the curved surface can be configured to alter a shape of a lens (e.g., the first lens (131) or the second lens (132)) to conform to the shape of the curved surface to correct for astigmatism.

In an embodiment, the vision correction adapter includes discrete point contacts positioned on a tilted surface. A shape of the tilted surface can be based on double vision (e.g., a degree of double vision and an orientation of double vision), and the discrete point contacts positioned on the tilted surface can be configured to tilt a lens (e.g., the first lens (131) or the second lens (132)) to conform to the tilted surface to correct for double vision.

In an embodiment, the vision correction adapter includes discrete point contacts positioned on a curved surface. A shape of the curved surface can be based on astigmatism and double vision. The discrete point contacts positioned on the curved surface can be configured to alter a shape of a lens (e.g., the first lens (131) or the second lens (132)) and to tilt the lens to correct for astigmatism and double vision.

In an embodiment, the vision correction adapter includes first discrete point contacts positioned on a curved surface and second discrete point contacts positioned on a tilted surface. A shape of the curved surface can be based on astigmatism. A shape of the tilted surface can be based on double vision. The first discrete point contacts positioned on the curved surface can be configured to alter a shape of a lens (e.g., a flexible lens) (e.g., the first lens (131)) to correct for astigmatism. The second discrete point contacts positioned on the tilted surface can be configured to tilt another lens (e.g., a flexible lens) (e.g., the second lens (132)) to correct for double vision.

Depending on a mechanical reference such as a reference plane in an optical system, the vision correction adapter can be positioned outside of a lens system (e.g., including two lenses) and not between two lenses, and can control the spacing, tilting, and/or bending of a lens relative to another lens. The vision correction adapter can bend one or both lenses simultaneously. The vision correction adapter can tilt one lens or both lenses simultaneously with respect to a reference axis. The vision correction adapter can change a spacing between two lenses, or spacing(s) between one or two lenses to a reference surface. The vision correction adapter can be positioned between a lens in the lens system and another optical component (e.g., the display device (120)) and can be configured to change a spacing between the lens and the other optical component. The vision correction adapter can be positioned between the two lenses in the lens system and can be configured to change the spacing between the two lenses in the lens system. For example, the vision correction adapter is placed outside the lens system, such as between the lens system and a display device, such that a spacing between the two lenses remains unchanged and a spacing between the lens system and the display device changes. In an example, the vision correction adapter can be placed in the lens system such that a spacing between the two lenses changes, and a spacing between the display device (e.g., (120)) to one (e.g., (132)) of the two lenses remains unchanged.

In some examples, the center region of the vision correction adapter (e.g., (401) or (801)) does not include an opening. AR coatings can be applied to the surfaces of the vision correction adapter to reduce unwanted reflections of the light beams, for example, to reduce or eliminate ghosting due to the multi-reflections at the surfaces of the vision correction adapter.

In some embodiments, one or more lenses in the optical system (110) of the display system (100) can be flexible. A lens can be made flexible by having a thickness less than a threshold (e.g., being mechanically thin) to add flexibility. The lens can be made from lens material(s) (e.g., (145) or (146)) that are flexible and/or durable to improve durability and/or flexibility. The lens material(s) can include polymer, such as cyclic olefin copolymer (COC), PMMA, and/or the like.

Figures 9A, 9B:
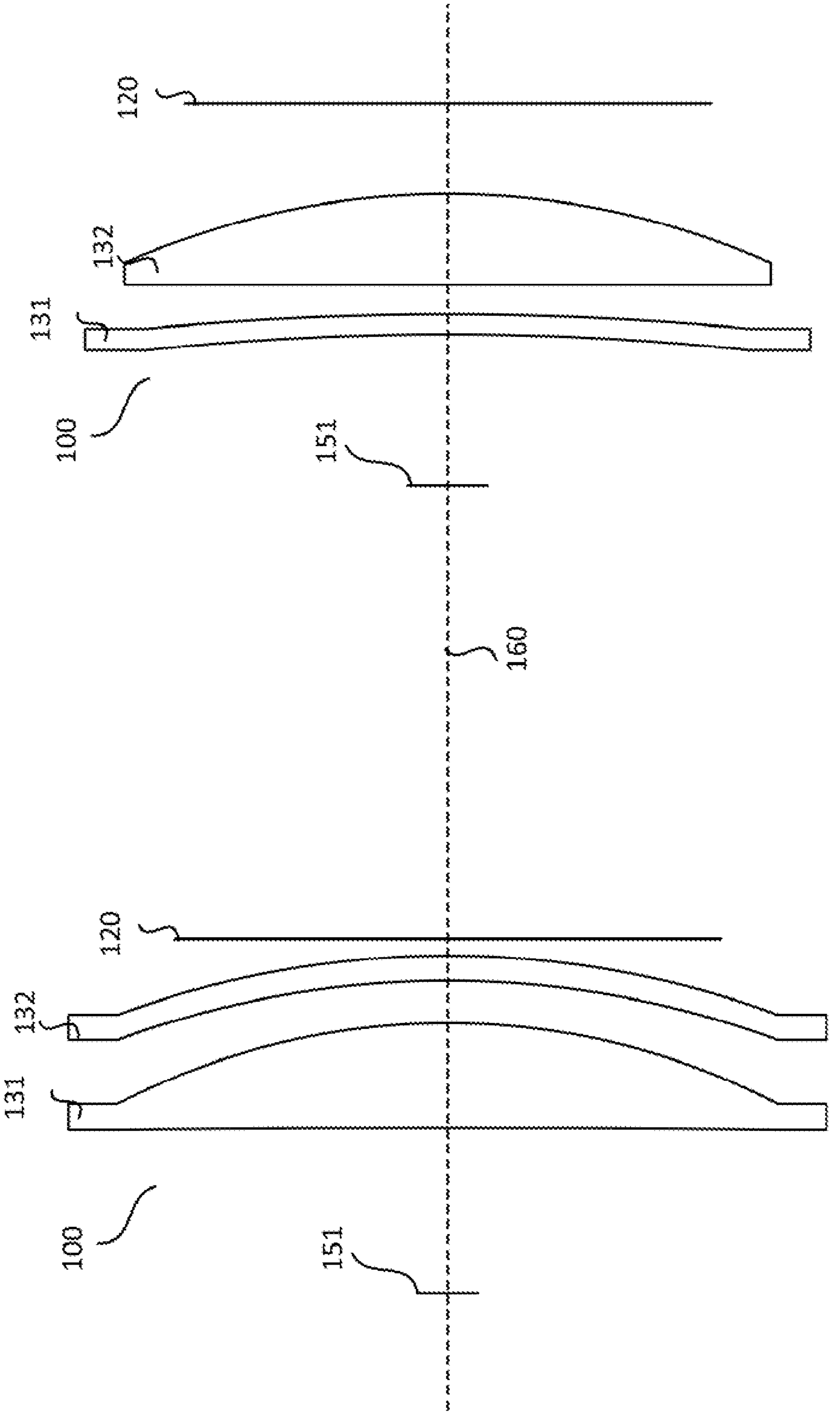
FIGS. 9A-9B show examples of flexible lens used in a display system according to embodiments of the disclosure.

FIGS. 9A-9B show examples of flexible lens used in the display system (100) according to embodiments of the disclosure. FIGS. 9A-9B show portions of the display system (100) including the first lens (131) and the second lens (132). In the example shown in FIG. 9A, the second lens (132) (e.g., a display lens) is made flexible. The second lens (132) can be relatively thin. The second lens (132) can be an aspheric-aspheric lens. The first lens (131) can be a plano-spheric lens. The first lens (131) and the second lens (132) can be made from polymer, such as COC. A vision correction adapter can be positioned between the first lens (131) and the second lens (132), such as against the second lens (132) to tilt and/or flex the second lens (132) to correct for vision defect(s).

In the example shown in FIG. 9B, the first lens (131) (e.g., an eye lens) is made flexible. The first lens (131) can be relatively thin. The first lens (131) can be an aspheric-aspheric lens. The second lens (132) can be a plano-spheric lens. The first lens (131) can be made from polymer, such as PMMA. The second lens (132) can be made from glass (e.g., BK7). A vision correction adapter can be positioned between the first lens (131) and the second lens (132), such as against the first lens (131) to tilt and/or flex the first lens (131) to correct for vision defect(s).

Birefringence of a flexible (e.g., bendable) lens can be managed if the flexible lens is inside a polarization system path. Birefringence of the flexible lens that is outside the polarization system path may not need to be managed.

In an example, the vision correction adapter described in the disclosure can be used to correct for vision defect(s) including nearsightedness/farsightedness, astigmatism, and/or double vision when the optical path in the optical system does not fold, for example, light beams only travel through the optical system (110) once.

The display system (100) can be a component in an artificial reality system. The artificial reality system can adjust reality in some manner into artificial reality and then present the artificial reality to a user. The artificial reality can include, e.g., a virtual reality (VR), an augmented reality (AR), a mixed reality (MR), a hybrid reality, or some combination and/or derivatives thereof. Artificial reality content may include completely generated content or generated content combined with captured (e.g., real world) content. The artificial reality content may include video, audio, haptic feedback, or some combination thereof, and any of which can be presented in a single channel or in multiple channels (such as stereo video that produces a three-dimensional effect to the user). In some examples, the display system (100) can be applied to playback of live or prerecorded video.

In an embodiment, a "near eye" display system can include an optical system (e.g., including one or more optical elements) and a display device that are placed within the distance threshold of an eye of a user when the NED system (100) (e.g., an HMD, or smart glasses) is utilized. Referring to FIG. 5A, the distance D1 between the display device (120) and the area (151) can be less than or equal to the distance threshold. In an example, the distance D1 is between the display device (120) and the eye (60).

The display system (100) can be a NED system implemented in various forms, such as an HMD system, smart glasses, a smart phone, and/or the like. In some examples, the artificial reality system is implemented as a standalone NED system. In some examples, the artificial reality system is implemented as a NED system connected to a host computer system, such as a server device, a console device, and the like.

To achieve high quality imaging, the reflective polarizer (139) is to have high-quality, such as a high reflectance (e.g., the high average reflectance) in the block direction, a high transmittance (e.g., the high average transmittance) in the pass direction, relatively small surface roughness, and the like. Further, the AR coating can be applied to any suitable surface(s) in the optical system (110) to reduce or eliminate ghosting due to the multi-reflections at various interfaces.

Polarized catadioptric optical systems are emerging solutions for virtual reality HMDs. A good VR optical system can include a large pupil volume (also referred to as an eye box) to accommodate multiple interpupillary distances and to allow for eye rotation as the user scans across the FOV. In an example, the eye box indicates a volume where an eye receives an acceptable view of an image. A size and a location of the eye box can be related to a number of constraints, such as a FOV and image quality. In an example, the eye box indicates a range of eye positions, at an eye relief distance, from which an image produced by the optical system (110) is visible. The eye box can include eye movements, such as eye rotation and/or lateral movement.

In a polarized catadioptric optical system, such as the display system (100), a folded optical path (e.g., the folded path (125)) can be used to achieve a relatively high optical power with a compact form factor. In the example shown in FIG. 5A, the beam splitter (141) is a curved mirror that partially reflects and partially transmits light, and the reflective polarizer (139) can reflect as a planar mirror or transmit light depending on a polarization state of the light. Design freedoms available in a folded optical system (e.g., the optical system (110)) can provide benefits to HMD systems. The benefits can include a high resolution achieved with reflective imaging, a wide FOV (e.g., by using low aberration lenses), a compact size, a decreased weight, an ability to adjust focus, and forming a larger eye box. The FOV can indicate an extent of an observable world that is seen or detected by a light receiver (also referred to as an optical sensor). In an example, the FOV is indicated by a solid angle within which the light detector can detect or receive light. The optical system (110) shown in FIG. 5A can be manufactured, for example, by controlling a curved form and surface finish of the first lens (131) and the second lens (132). A pancake optical system (e.g., the display system (100)) can deliver a comfortable and immersive user experience.

The display system (100) can have a large pupil volume to accommodate multiple interpupillary distances and to allow for eye rotation as a user scans across the FOV. An interpupillary distance (IPD) is a distance between centers of pupils of eyes of a user. IPDs can vary with respect to age, gender, or the like. The display system (100) can be designed by taking IPD variance into account such that the optical system (110) can accommodate various users with different IPDs. In an example, IPDs vary from approximately 50 to 80 mm.

In an example, the display system (100) can adjust a diopter of a lens in the lens system (130) to match the prescription. In an example, the diopter indicates a virtual object distance. Increasing the diopter can make an object appear closer. The focus accommodation can be achieved by changing an optical power of the optical system. The optical power of a folded mirror cavity (e.g., the optical cavity between the beam splitter (141) and the reflective polarizer (139)) can be changed by varying a cavity length (or a gap) relative to a reference cavity length corresponding to a reference optical power, as described in FIGS. 5A-5D.

Referring back to FIG. 5A, the shift block (170) can be coupled to the optical system (110) and optionally the display device (120) to apply suitable spatial pixel shift adjustments to the virtual images. The controller (180) can be coupled to the optical system (110) and the shift block (170) to control the operations of the optical system (110) and the shift block (170).

The shift block (170) can apply the spatial pixel shift adjustment mechanically or optically. The shift block (170) can include a mechanical shifter to apply the spatial pixel shift adjustment. In some examples, the mechanical shifter can shift the display device (120) to apply the spatial pixel shift adjustment. In some examples, the mechanical shifter can shift at least one optical element (e.g., the first lens (131) or the second lens (132)) to apply the spatial pixel shift adjustment. A relatively small adjustment to the gap (197) can be amplified, for example, 3 times, due to the folded path (125) in the optical cavity.

The display system (100) can include other suitable mechanical, electrical and optical components. For example, the display system (100) includes a frame (101) that can protect other components of the display system (100). In another example, the display system (100) can include a strap (not shown) to fit the display system (100) on a user's head. In another example, the display system (100) can include communication components (not shown, e.g., communication software and hardware) to wirelessly communicate with a network, a host device, and/or other device. In some examples, the display system (100) can include a light combiner that can combine the virtual content and see-through real environment.

Referring to FIG. 5A, in some examples, parameters of the display system (100) include a field of view (FOV), an eye relief, a lens track length, a display size, a size of the area (151), and/or the like. The eye relief (e.g., a distance D3) can refer to a distance between a viewing position of a light receiver (e.g., the area (151)) and the lens system (130). In an example, the distance D3 between the area (151) and the last optical component (e.g., the first lens (131)) in the optical system (110) before the area (151) is 14 mm. The lens track length (e.g., a distance D4) can refer to a distance between the display device (120) and the lens system (130). The distance D4 between the display device (120) and the first lens (131) is 15.9 mm. In the example shown in FIG. 5A, the distance D4 is measured from the display device (120) to the reflective polarizer (139). In an example, D1 is equal to a sum of D3 and D4. In another example, the distance D4 is measured from the display device (120) to the surface (137). The display size is indicated by a display image circle that is imaged by the optical system (110) onto the area (151), and the display image circle has a radius of 18.9 mm. The size (e.g., pupil size) of the area (151) can be 5 mm. The FOV of the optical system (110) is 110°. The optical system (110) can be used in a suitable range of polychromatic wavelengths, such as in the visible wavelengths (e.g., 380 to 780 nm with a 400 nm), polychromatic wavelengths near green color (e.g., 500 to 540 nm with a 40 nm bandwidth), or the like.

The parameter values provided in the description are merely exemplary and are not intended to limit the scope of the disclosure. The optical path including ray diagrams provided in the description are merely exemplary and for illustration purposes and are not intended to limit the scope of the disclosure. The drawings provided in the description are merely exemplary and for illustration purposes and are not to scale.

Figure 10:
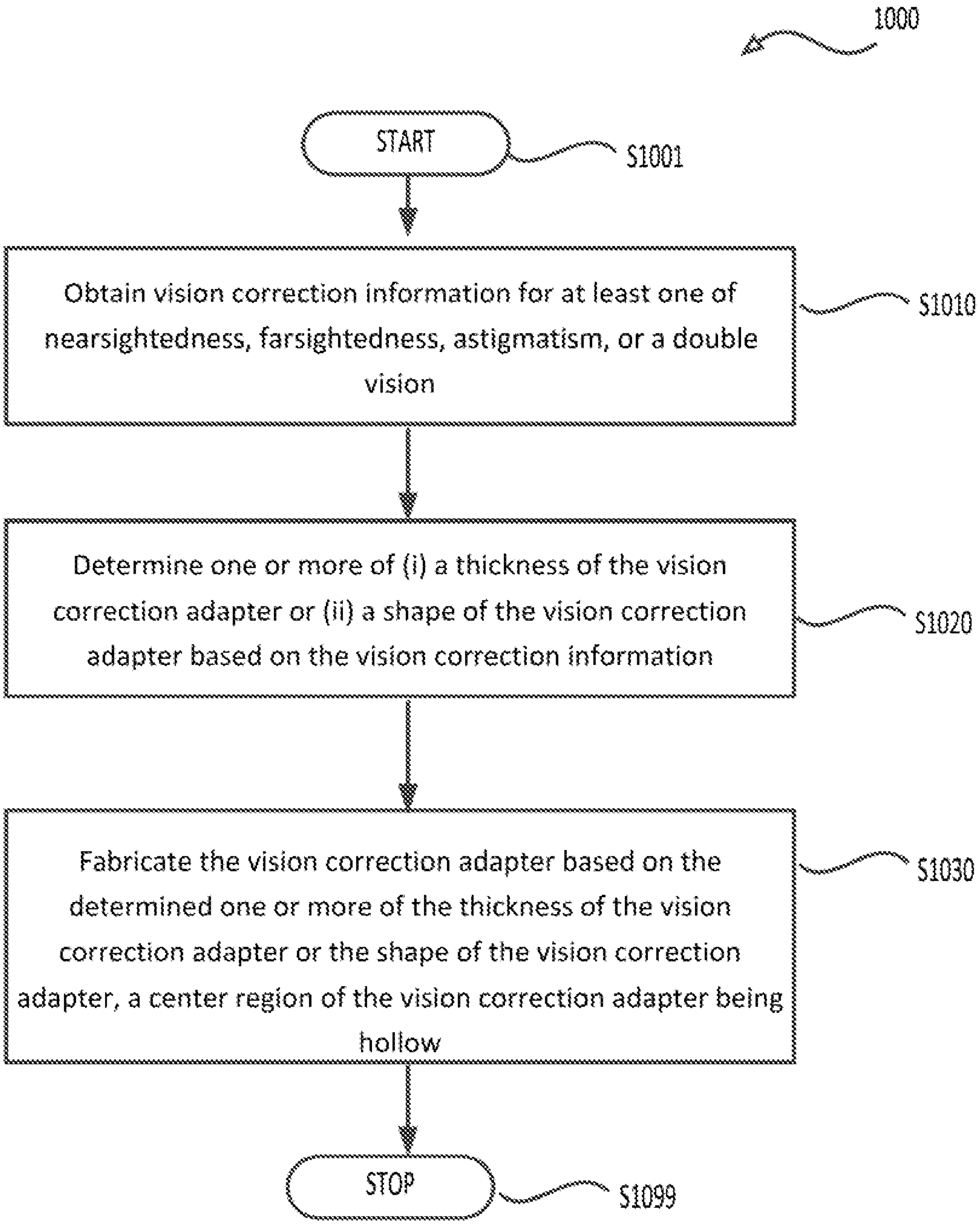
FIG. 10 shows a flow chart outlining a process (e.g., a vision correction process) according to some embodiment of the disclosure.

FIG. 10 shows a flow chart outlining a process (e.g., a vision correction process) (1000) according to some embodiment of the disclosure. In an example, a display system or an HMD system, such as the display system (100), includes an optical system (e.g., (110)), such as described above. The optical system can be configured to direct light beams from a display device or a real object to an eye of a user of the display system, such as described in FIG. 5A. The optical system can include a vision correction adapter configured to correct for vision defects.

In various examples, multiple users can use the display system. In an example, a user with changing eye prescription information can use the display system. Thus, the display system is to be adapted to different eye conditions corresponding to different eye prescription information. In an embodiment, before a user uses the display system, the vision correction process (1000) can be implemented to adjust the optical system based at least on an eye condition of the user. The vision correction process (1000) can be configured to correct for nearsightedness/farsightedness, astigmatism, double vision, and/or the like. The process (1000) starts at step (S1001) and proceeds to step (S1010).

At step (S1010), vision correction information for at least one of nearsightedness, farsightedness, astigmatism, and double vision can be obtained. The vision correction information can include eye prescription information of the user.

In an embodiment, the eye prescription information of an eye indicating (i) nearsightedness or farsightedness and (ii) astigmatism can include: Sphere (SPH), Cylinder (CYL), and Axis. The parameter "Sphere (SPH)" can indicate an optical power (e.g., in a unit of diopter (D), such as −1D or +2D) of a lens used to correct for nearsightedness or farsightedness of the eye. The parameter "Sphere (SPH)" can indicate a degree of nearsightedness or farsightedness of the eye. An example of the parameter "Sphere (SPH)" is shown by the relative diopter in FIG. 5D. A "plus" (+) sign in front of the number can indicate that the eye is farsighted, and the lens is to converge light. A "minus" (−) sign can indicate that the eye is nearsighted, and the lens is to diverge light. The further away from zero the number on the eye prescription, the worse the eyesight and the more vision correction (e.g., a stronger prescription) that is required.

A relative diopter (e.g., a parameter Cylinder (CYL)) can measure in diopters the degree of the astigmatism of the eye and can be a negative or a positive number, as shown by the relative diopter in FIG. 6B. A bigger Cylinder (CYL) can indicate more astigmatism. A parameter Axis can be a number between 0° and 180° that can indicate an orientation of the astigmatism.

At step (S1020), one or more of (i) a thickness T of the vision correction adapter and (ii) a shape of the vision correction adapter can be determined based on the vision correction information. For example, the eye prescription information is converted to mechanical parameters of the vision correction adapter.

Nearsightedness or farsightedness indicated by diopter (e.g., an optical diopter) such as the parameter Sphere (SPH) can be converted into the thickness T of the vision correction adapter, such as described with reference to FIGS. 4A-4B and 5A-5D.

The shape of the vision correction adapter can be determined based on the astigmatism and/or the double vision.

Astigmatism indicated by a cylindrical diopter (or an astigmatism diopter) such as the parameters Cylinder (CYL) and Axis can be converted into the shape of the vision correction adapter (e.g., a radius of curvature of a cylindrical surface) of the vision correction adapter, such as described with reference to FIGS. 4C-4H and 6A-6B.

Double vision (e.g., a binocular double vision) indicated by a prism diopter can be converted to the shape of the vision correction adapter such as a tilt angle (e.g., a tilt angle of a tilted surface of the vision correction adapter), such as shown in FIGS. 3G, 4E-4H, and 8A-8B.

The cylindrical surface of the vision correction adapter configured to correct for astigmatism and the tilted surface of the vision correction adapter configured to correct for double vision can be a same surface or different surfaces. When the cylindrical surface and the tilted surface are the same surface, the shape of cylindrical surface can be based on the astigmatism and the double vision.

At (S1030), the vision correction adapter can be fabricated based on the determined one or more of the thickness of the vision correction adapter and the shape of the vision correction adapter. A center region of the vision correction adapter can be made hollow. In an example, the vision correction adapter is made using 3D printing.

Then, the process (1000) proceeds to step (S1099) and terminates.

The process (1000) can be suitably adapted to various scenarios and steps in the process (1000) can be adjusted accordingly. One or more of the steps in the process (1000) can be adapted, omitted, repeated, and/or combined. Any suitable order can be used to implement the process (1000). Additional step(s) can be added.

In an embodiment, prior to (S1020), a relationship between the relative diopter and the thickness T of the vision correction adapter, such as a lookup table in FIG. 5D is determined (e.g., measured or simulated empirically). A relationship between the relative diopter (e.g., the cylindrical power) and the radius of curvature of the vision correction adapter, such as a lookup table in FIG. 6B is determined (e.g., measured or simulated empirically). A relationship between the prism diopter and the tilt angle of the tilted surface of the vision correction adapter, such as a lookup table in FIG. 8B is determined (e.g., measured or simulated empirically).

In an example, the fabricated vision correction adapter is configured to space apart a first lens (e.g., (131)) and a second lens (e.g., (132)) in the optical system to correct for the at least one of nearsightedness, farsightedness, astigmatism, and the double vision.

In an example, a standard adapter in a headset (e.g., including the display system (100)) is replaced with the fabricated vision correction adapter. The replacement and the positioning of the fabricated vision correction adapter can be controlled via the controller (180) with high accuracy as described above.

In an example, the thickness of the vision correction adapter is determined based on the nearsightedness or the farsightedness. The first lens and the second lens are spaced apart by the thickness of the vision correction adapter to correct for the nearsightedness or the farsightedness.

In an example, the first lens is flexible.

The shape of the vision correction adapter is determined based on a degree of the astigmatism and an orientation of the astigmatism. The fabricated vision correction adapter can be positioned to alter a shape of the first lens to conform to the shape of the vision correction adapter to correct for the astigmatism.

In an example, the shape of the vision correction adapter is determined based on the double vision. The shape of the vision correction adapter can indicate a tilt angle and an orientation of a tilted surface of the vision correction adapter. The fabricated vision correction adapter can be positioned to tilt the first lens according to the tilt angle and the orientation of the tilted surface of the vision correction adapter to correct for the double vision.

Embodiments in the disclosure may be used separately or combined in any order.

A computer or computer-readable medium can control various aspects of an HMD system in which a display system (e.g., (100)) including an optical system (e.g., (110)) is incorporated. Various aspects of the display system including controlling movements and positioning of the optical components (e.g., the first lens (131), the second lens (132), the display device (120), a vision correction adapter) can be implemented as computer software using computer-readable instructions and physically stored in one or more computer-readable media. For example, FIG. 11 shows a computer system (1100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
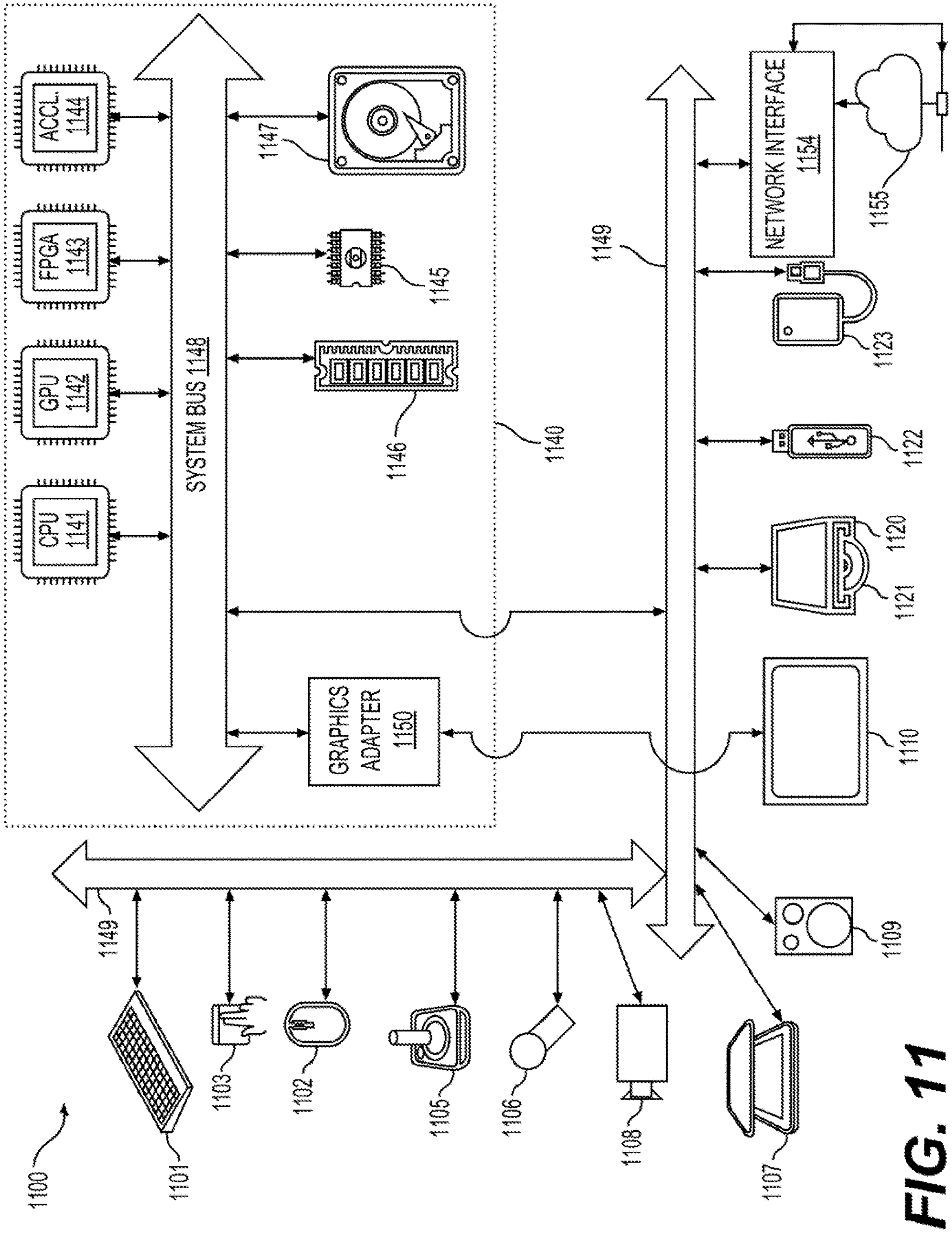
FIG. 11 is a schematic illustration of a computer system in accordance with an embodiment.

The components shown in FIG. 11 for computer system (1100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch-screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as touch-screens (1110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface (1154) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1042), specialized programmable processing units in the form of Field Programmable Gate Areas (FPGA) (1043), hardware accelerators (1044) for certain tasks, graphics adapters (1050), and so forth. These devices, along with Read-only memory (ROM) (1045), Random-access memory (1046), internal mass storage (1047) such as internal non-user accessible hard drives, SSDs, and the like, may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the touch-screen (1110) can be connected to the graphics adapter (1150). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can be also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (1100) having architecture, and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various embodiments of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An optical system, comprising:

a first lens including a first optically transparent member having a first surface and a second surface, a second lens including a second optically transparent member having a third surface and a fourth surface, and a vision correction adapter that is positioned between the first lens and the second lens, wherein the vision correction adapter is an annular cylinder having two surfaces that are parallel and planar, the annular cylinder includes a central opening, the annular cylinder is solid and has a fixed configuration, and a thickness of the vision correction adapter between the two surfaces is constant, the first surface and the second surface of the first lens are unmodified by the vision correction adapter, the third surface and the fourth surface of the second lens are unmodified by the vision correction adapter, and the first lens and the second lens are spaced apart by the thickness of the vision correction adapter.

2. The optical system according to claim 1, further comprising:

a reflective polarizer disposed on one of the first surface and the second surface, the reflective polarizer being configured to pass through light having a first linear polarization state and reflect light having a second linear polarization state that is orthogonal to the first linear polarization state, and a beam splitter disposed on one of the third surface and the fourth surface, the beam splitter being configured to partially transmit and partially reflect light incident onto the beam splitter, an optical cavity of at least one of the first lens and the second lens being formed between the reflective polarizer and the beam splitter, wherein the optical system is configured to direct light from a display device to a viewing area, a path of the light from the display device traveling through the optical cavity a plurality of times.

3. The optical system according to claim 2, wherein the thickness of the vision correction adapter between the two surfaces is less than a threshold thickness when the vision correction adapter is configured to correct nearsightedness, the threshold thickness being a thickness at which the optical system is configured to produce collimated rays for rays emitted from a pixel of the display device.

4. The optical system according to claim 2, wherein the thickness of the vision correction adapter between the two surfaces is larger than a threshold thickness when the vision correction adapter is configured to correct farsightedness, the threshold thickness being a thickness at which the optical system is configured to produce collimated rays for rays emitted from a pixel of the display device.

* * * * *